(12) United States Patent
Krishnamurthy et al.

(10) Patent No.: US 6,984,198 B2
(45) Date of Patent: Jan. 10, 2006

(54) EXPERIMENT MANAGEMENT SYSTEM, METHOD AND MEDIUM

(75) Inventors: Badri N. Krishnamurthy, Fremont, CA (US); Parris C. M. Hawkins, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/928,474

(22) Filed: Aug. 14, 2001

(65) Prior Publication Data

US 2003/0036815 A1 Feb. 20, 2003

(51) Int. Cl.
G01R 31/26 (2006.01)

(52) U.S. Cl. .................................................. 483/14
(58) Field of Classification Search ................ 438/14; 257/773; 324/158.1
See application file for complete search history.

(56) References Cited

U.S. PATENT DOCUMENTS

| | | | |
|---|---|---|---|
| 3,205,485 A | 9/1965 | Noltingk | |
| 3,229,198 A | 1/1966 | Libby | |
| 3,767,900 A | 10/1973 | Chao et al. | |
| 3,920,965 A | 11/1975 | Sohrwardy | |

(Continued)

FOREIGN PATENT DOCUMENTS

| | | |
|---|---|---|
| CA | 2050247 | 8/1991 |
| CA | 2165847 | 8/1991 |
| CA | 2194855 | 8/1991 |
| EP | 0 621 522 A2 | 10/1994 |

(Continued)

OTHER PUBLICATIONS

US 6,150,664, 11/2000, Su (withdrawn)
U.S. Appl. No. 09/927,444, filed Aug. 13, 2001, Ward et al.
Zhou, Zhen–Hong and Rafael Reif. Aug. 1995. "Epi–Film Thickness Measurements Using Emission Fourier Transform Infrared Spectroscopy–Part II: Real–Time in Situ Process Monitoring and Control." IEEE Transactions on Semiconductor Manufacturing, vol.8, No. 3.
Telfeyan, Roland, James Moyne, Nauman Chaudhry, James Pugmire, Scott Shellman, Duane Boning, William Moyne, Arnon Hurwitz, and John Taylor. Oct. 1995. "A Multi–Level Approach to the Control of a Chemical–Mechanical Planarization Process." Minneapolis, Minnesota: 42$_{nd}$ National Symposium of the American Vacuum Society.

(Continued)

Primary Examiner—John F. Niebling
Assistant Examiner—Andre' C. Stevenson
(74) Attorney, Agent, or Firm—Wilmer Cutler Pickering Hale and Dorr, LLP

(57) ABSTRACT

Systems, methods and mediums are provided for automating experiments within an automated environment without the need to disassociate the test subject (e.g., the semiconductor chip or chips) from that environment. An "experiment" may be a pre-planned deviation of an established (e.g., pre-defined) process utilizing the automated environment.

A computer-implemented method, system and computer-readable medium for managing experiments, such as those relating to semiconductor technology. An experiment order includes some deviation from a base process capable of operating in an automated environment. An approval of the experiment order is obtained from a distribution list of users, while permitting the users to attach documents to the experiment order or perhaps modify the experiment. The experiment order is translated into processing data suitable for implementation by said automated environment, and stored. The experiment is caused to be executed in conjunction with at least some portion of said base process via the automated environment according to the processing data.

31 Claims, 13 Drawing Sheets

U.S. PATENT DOCUMENTS

| | | |
|---|---|---|
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 4,974,543 A | 12/1990 | Jansen |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,240,552 A | 8/1993 | Yu et al. |
| 5,270,222 A | 12/1993 | Moslehi |
| 5,283,141 A | 2/1994 | Yoon et al. |
| 5,329,463 A | 7/1994 | Sierk et al. |
| 5,338,630 A | 8/1994 | Yoon et al. |
| 5,347,446 A | 9/1994 | Iino et al. |
| 5,369,544 A | 11/1994 | Mastrangelo |
| 5,375,064 A | 12/1994 | Bollinger |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,621,241 A | 4/1997 | Jain |
| 5,627,083 A | 5/1997 | Tounai |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,657,254 A | 8/1997 | Sierk et al. |
| 5,660,895 A | 8/1997 | Lee et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,719,796 A | 2/1998 | Chen |
| 5,735,055 A | 4/1998 | Hochbein et al. |
| 5,761,064 A | 6/1998 | La et al. |
| 5,761,065 A | 6/1998 | Kittler et al. |
| 5,777,901 A | 7/1998 | Berezin et al. |
| 5,787,021 A | 7/1998 | Samaha |
| 5,787,269 A | 7/1998 | Hyodo |
| 5,812,407 A | 9/1998 | Sato et al. |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,874,345 A | 2/1999 | Coronel et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,937,323 A | 8/1999 | Orczyk et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |
| 6,113,462 A | 9/2000 | Yang |
| 6,114,238 A | 9/2000 | Liao |
| 6,127,263 A | 10/2000 | Parikh |
| 6,128,016 A | 10/2000 | Coelho et al. |
| 6,136,163 A | 10/2000 | Cheung et al. |
| 6,141,660 A | 10/2000 | Bach et al. |

| | | | | | | |
|---|---|---|---|---|---|---|
| 6,143,646 | A | 11/2000 | Wetzel | 6,340,602 B1 | 1/2002 | Johnson et al. |
| 6,148,099 | A | 11/2000 | Lee et al. | 6,345,288 B1 | 2/2002 | Reed et al. |
| 6,148,239 | A | 11/2000 | Funk et al. | 6,345,315 B1 | 2/2002 | Mishra |
| 6,148,246 | A | 11/2000 | Kawazome | 6,346,426 B1 | 2/2002 | Toprac et al. |
| 6,150,270 | A | 11/2000 | Matsuda et al. | 6,355,559 B1 | 3/2002 | Havemann et al. |
| 6,157,864 | A | 12/2000 | Schwenke et al. | 6,360,133 B1 | 3/2002 | Campbell et al. |
| 6,159,075 | A | 12/2000 | Zhang | 6,360,184 B1 | 3/2002 | Jacquez |
| 6,159,644 | A | 12/2000 | Satoh et al. | 6,363,294 B1 | 3/2002 | Coronel et al. |
| 6,161,054 | A | 12/2000 | Rosenthal et al. | 6,366,934 B1 | 4/2002 | Cheng et al. |
| 6,169,931 | B1 | 1/2001 | Runnels | 6,368,879 B1 | 4/2002 | Toprac |
| 6,172,756 | B1 | 1/2001 | Chalmers et al. | 6,368,883 B1 | 4/2002 | Bode et al. |
| 6,173,240 | B1 | 1/2001 | Sepulveda et al. | 6,368,884 B1 | 4/2002 | Goodwin et al. |
| 6,175,777 | B1 | 1/2001 | Kim | 6,373,033 B1 | 4/2002 | Waard et al. |
| 6,178,390 | B1 | 1/2001 | Jun | 6,379,980 B1 | 4/2002 | Toprac |
| 6,181,013 | B1 | 1/2001 | Liu et al. | 6,381,564 B1 | 4/2002 | Davis et al. |
| 6,183,345 | B1 | 2/2001 | Kamono et al. | 6,388,253 B1 | 5/2002 | Su |
| 6,185,324 | B1 | 2/2001 | Ishihara et al. | 6,391,780 B1 | 5/2002 | Shih et al. |
| 6,191,864 | B1 | 2/2001 | Sandhu | 6,395,152 B1 | 5/2002 | Wang |
| 6,192,291 | B1 | 2/2001 | Kwon | 6,397,114 B1 | 5/2002 | Eryurek et al. |
| 6,197,604 | B1 | 3/2001 | Miller et al. | 6,400,162 B1 | 6/2002 | Mallory et al. |
| 6,201,208 | B1 | 3/2001 | Wendt et al. | 6,405,096 B1 | 6/2002 | Toprac et al. |
| 6,204,165 | B1 | 3/2001 | Ghoshal | 6,405,144 B1 | 6/2002 | Toprac et al. |
| 6,210,983 | B1 | 4/2001 | Atchison et al. | 6,417,014 B1 | 7/2002 | Lam et al. |
| 6,211,094 | B1 | 4/2001 | Jun et al. | 6,427,093 B1 | 7/2002 | Toprac |
| 6,212,961 | B1 | 4/2001 | Dvir | 6,432,728 B1 | 8/2002 | Tai et al. |
| 6,214,734 | B1 | 4/2001 | Bothra et al. | 6,435,952 B1 | 8/2002 | Boyd et al. |
| 6,217,412 | B1 | 4/2001 | Campbell et al. | 6,438,438 B1 | 8/2002 | Takagi et al. |
| 6,217,658 | B1 | 4/2001 | Orczyk et al. | 6,440,295 B1 | 8/2002 | Wang |
| 6,219,711 | B1 | 4/2001 | Chari | 6,442,496 B1 | 8/2002 | Pasadyn et al. |
| 6,222,936 | B1 | 4/2001 | Phan et al. | 6,449,524 B1 | 9/2002 | Miller et al. |
| 6,226,563 | B1 | 5/2001 | Lim | 6,455,415 B1 | 9/2002 | Lopatin et al. |
| 6,226,792 | B1 | 5/2001 | Goiffon et al. | 6,455,937 B1 | 9/2002 | Cunningham |
| 6,228,280 | B1 | 5/2001 | Li et al. | 6,465,263 B1 | 10/2002 | Coss, Jr. et al. |
| 6,230,069 | B1 | 5/2001 | Campbell et al. | 6,470,230 B1 | 10/2002 | Toprac et al. |
| 6,232,236 | B1 | 5/2001 | Shan et al. | 6,479,902 B1 | 11/2002 | Lopatin et al. |
| 6,236,903 | B1 | 5/2001 | Kim et al. | 6,479,990 B2 | 11/2002 | Mednikov et al. |
| 6,237,050 | B1 | 5/2001 | Kim et al. | 6,482,660 B2 | 11/2002 | Conchieri et al. |
| 6,240,330 | B1 | 5/2001 | Kurtzberg et al. | 6,484,064 B1 | 11/2002 | Campbell |
| 6,240,331 | B1 | 5/2001 | Yun | 6,486,492 B1 | 11/2002 | Su |
| 6,245,581 | B1 | 6/2001 | Bonser et al. | 6,492,281 B1 | 12/2002 | Song et al. |
| 6,246,972 | B1 | 6/2001 | Klimasauskas | 6,495,452 B1 | 12/2002 | Shih |
| 6,248,602 | B1 | 6/2001 | Bode et al. | 6,503,839 B2 | 1/2003 | Gonzales et al. |
| 6,249,712 | B1 | 6/2001 | Boiquaye | 6,515,368 B1 | 2/2003 | Lopatin et al. |
| 6,252,412 | B1 | 6/2001 | Talbot et al. | 6,517,413 B1 | 2/2003 | Hu et al. |
| 6,253,366 | B1 | 6/2001 | Mutschler, III | 6,517,414 B1 | 2/2003 | Tobin et al. |
| 6,259,160 | B1 | 7/2001 | Lopatin et al. | 6,528,409 B1 | 3/2003 | Lopatin et al. |
| 6,263,255 | B1 | 7/2001 | Tan et al. | 6,529,789 B1 | 3/2003 | Campbell et al. |
| 6,268,270 | B1 | 7/2001 | Scheid et al. | 6,532,555 B1 | 3/2003 | Miller et al. |
| 6,271,670 | B1 | 8/2001 | Caffey | 6,535,783 B1 | 3/2003 | Miller et al. |
| 6,276,989 | B1 | 8/2001 | Campbell et al. | 6,537,912 B1 | 3/2003 | Agarwal |
| 6,277,014 | B1 | 8/2001 | Chen et al. | 6,540,591 B1 | 4/2003 | Pasadyn et al. |
| 6,278,899 | B1 | 8/2001 | Piche et al. | 6,541,401 B1 | 4/2003 | Herner et al. |
| 6,280,289 | B1 | 8/2001 | Wiswesser et al. | 6,546,508 B1 | 4/2003 | Sonderman et al. |
| 6,281,127 | B1 | 8/2001 | Shue | 6,556,881 B1 | 4/2003 | Miller |
| 6,284,622 | B1 | 9/2001 | Campbell et al. | 6,560,504 B1 | 5/2003 | Goodwin et al. |
| 6,287,879 | B1 | 9/2001 | Gonzales et al. | 6,563,308 B2 | 5/2003 | Nagano et al. |
| 6,290,572 | B1 | 9/2001 | Hofmann | 6,567,717 B2 | 5/2003 | Krivokapic et al. |
| 6,291,367 | B1 | 9/2001 | Kelkar | 6,580,958 B1 | 6/2003 | Takano |
| 6,292,708 | B1 | 9/2001 | Allen et al. | 6,587,744 B1 | 7/2003 | Stoddard et al. |
| 6,298,274 | B1 | 10/2001 | Inoue | 6,590,179 B2 | 7/2003 | Tanaka et al. |
| 6,298,470 | B1 | 10/2001 | Breiner et al. | 6,604,012 B1 | 8/2003 | Cho et al. |
| 6,303,395 | B1 * | 10/2001 | Nulman .................. 438/14 | 6,605,549 B2 | 8/2003 | Leu et al. |
| 6,304,999 | B1 | 10/2001 | Toprac et al. | 6,607,976 B2 | 8/2003 | Chen et al. |
| 6,307,628 | B1 | 10/2001 | Lu et al. | 6,609,946 B1 | 8/2003 | Tran |
| 6,314,379 | B1 | 11/2001 | Hu et al. | 6,616,513 B1 | 9/2003 | Osterheld |
| 6,317,643 | B1 | 11/2001 | Dmochowski | 6,618,692 B2 | 9/2003 | Takahashi et al. |
| 6,320,655 | B1 | 11/2001 | Matsushita et al. | 6,624,075 B1 | 9/2003 | Lopatin et al. |
| 6,324,481 | B1 | 11/2001 | Atchison et al. | 6,625,497 B2 | 9/2003 | Fairbairn et al. |
| 6,334,807 | B1 | 1/2002 | Lebel et al. | 6,630,741 B1 | 10/2003 | Lopatin et al. |
| 6,336,841 | B1 | 1/2002 | Chang | 6,640,151 B1 | 10/2003 | Somekh et al. |
| 6,339,727 | B1 | 1/2002 | Ladd | 6,652,355 B2 | 11/2003 | Wiswesser et al. |

| | | |
|---|---|---|
| 6,660,633 B1 | 12/2003 | Lopatin et al. |
| 6,678,570 B1 | 1/2004 | Pasadyn et al. |
| 6,708,074 B1 | 3/2004 | Chi et al. |
| 6,708,075 B2 | 3/2004 | Sonderman et al. |
| 6,725,402 B1 | 4/2004 | Coss, Jr. et al. |
| 6,728,587 B2 | 4/2004 | Goldman et al. |
| 6,735,492 B2 | 5/2004 | Conrad et al. |
| 6,751,518 B1 | 6/2004 | Sonderman et al. |
| 6,774,998 B1 | 8/2004 | Wright et al. |
| 2001/0001755 A1 | 5/2001 | Sandhu et al. |
| 2001/0003084 A1 | 6/2001 | Finarov |
| 2001/0006873 A1 | 7/2001 | Moore |
| 2001/0030366 A1 | 10/2001 | Nakano et al. |
| 2001/0039462 A1 | 11/2001 | Mendez et al. |
| 2001/0040997 A1 | 11/2001 | Tsap et al. |
| 2001/0042690 A1 | 11/2001 | Talieh |
| 2001/0044667 A1 | 11/2001 | Nakano et al. |
| 2002/0032499 A1 | 3/2002 | Wilson et al. |
| 2002/0058460 A1 | 5/2002 | Lee et al. |
| 2002/0070126 A1 | 6/2002 | Sato et al. |
| 2002/0077031 A1 | 6/2002 | Johansson et al. |
| 2002/0081951 A1 | 6/2002 | Boyd et al. |
| 2002/0089676 A1 | 7/2002 | Pecen et al. |
| 2002/0102853 A1 | 8/2002 | Li et al. |
| 2002/0107599 A1 | 8/2002 | Patel et al. |
| 2002/0107604 A1 | 8/2002 | Riley et al. |
| 2002/0113039 A1 | 8/2002 | Mok et al. |
| 2002/0127950 A1 | 9/2002 | Hirose et al. |
| 2002/0128805 A1 | 9/2002 | Goldman et al. |
| 2002/0149359 A1 | 10/2002 | Crouzen et al. |
| 2002/0165636 A1 | 11/2002 | Hasan |
| 2002/0183986 A1 | 12/2002 | Stewart et al. |
| 2002/0185658 A1 | 12/2002 | Inoue et al. |
| 2002/0193899 A1 | 12/2002 | Shanmugasundram et al. |
| 2002/0193902 A1 | 12/2002 | Shanmugasundram et al. |
| 2002/0197745 A1 | 12/2002 | Shanmugasundram et al. |
| 2002/0197934 A1 | 12/2002 | Paik |
| 2002/0199082 A1 | 12/2002 | Shanmugasundram et al. |
| 2003/0017256 A1 | 1/2003 | Shimane |
| 2003/0020909 A1 | 1/2003 | Adams et al. |
| 2003/0020928 A1 | 1/2003 | Ritzdorf et al. |
| 2003/0154062 A1 | 8/2003 | Daft et al. |

FOREIGN PATENT DOCUMENTS

| | | |
|---|---|---|
| EP | 0 747 795 A2 | 12/1996 |
| EP | 0 869 652 | 10/1998 |
| EP | 0 881 040 A2 | 12/1998 |
| EP | 0 895 145 A1 | 2/1999 |
| EP | 0 910 123 | 4/1999 |
| EP | 0 932 194 | 7/1999 |
| EP | 0 932 195 A1 | 7/1999 |
| EP | 1 066 925 A2 | 1/2001 |
| EP | 1 067 757 | 1/2001 |
| EP | 1 071 128 | 1/2001 |
| EP | 1 083 470 A2 | 3/2001 |
| EP | 1 092 505 A2 | 4/2001 |
| EP | 1072967 A3 | 11/2001 |
| EP | 1 182 526 A2 | 2/2002 |
| GB | 2 363 477 A | 12/2001 |
| GB | 2 365 215 A | 2/2002 |
| JP | 61-66104 | 4/1986 |
| JP | 61-171147 | 8/1986 |
| JP | 3-202710 | 9/1991 |
| JP | 05-151231 | 6/1993 |
| JP | 05-216896 | 8/1993 |
| JP | 05-266029 | 10/1993 |
| JP | 06-110894 | 4/1994 |
| JP | 06-176994 | 6/1994 |
| JP | 6-184434 | 7/1994 |
| JP | 06-252236 | 9/1994 |
| JP | 06-260380 | 9/1994 |
| JP | 8-23166 | 1/1996 |
| JP | 8-50161 | 2/1996 |
| JP | 8-304023 | 11/1996 |
| JP | 9-246547 | 9/1997 |
| JP | 10-34522 | 2/1998 |
| JP | 10-173029 | 6/1998 |
| JP | 11-126816 | 5/1999 |
| JP | 11-135601 | 5/1999 |
| JP | 2000-183001 | 6/2000 |
| JP | 2001-76982 | 3/2001 |
| JP | 2001-284299 | 10/2001 |
| JP | 2001-305108 | 10/2001 |
| JP | 2002-9030 | 1/2002 |
| JP | 2002-343754 | 11/2002 |
| TW | 434103 | 5/2001 |
| TW | 436383 | 5/2001 |
| TW | 455938 | 9/2001 |
| TW | 455976 | 9/2001 |
| WO | WO 95/34866 | 12/1995 |
| WO | WO 98/05066 | 2/1998 |
| WO | WO 98/45090 | 10/1998 |
| WO | WO 99/09371 | 2/1999 |
| WO | WO 99/25520 | 5/1999 |
| WO | WO 99/59200 | 11/1999 |
| WO | WO 00/00874 | 1/2000 |
| WO | WO 00/05759 | 2/2000 |
| WO | WO 00/35063 | 6/2000 |
| WO | WO 00/54325 | 9/2000 |
| WO | WO 00/79355 A1 | 12/2000 |
| WO | WO 01/01205 A2 | 1/2001 |
| WO | WO 01/11679 | 2/2001 |
| WO | WO 01/18623 | 3/2001 |
| WO | WO 01/25865 | 4/2001 |
| WO | WO 01/33277 | 5/2001 |
| WO | WO 01/33501 A1 | 5/2001 |
| WO | WO 01/52055 A3 | 7/2001 |
| WO | WO 01/52319 | 7/2001 |
| WO | WO 01/57823 A2 | 8/2001 |
| WO | WO 01/080306 | 10/2001 |
| WO | WO 02/17150 A1 | 2/2002 |
| WO | WO 02/31613 A2 | 4/2002 |
| WO | WO 02/31613 A3 | 4/2002 |
| WO | WO 02/33737 A2 | 4/2002 |
| WO | WO 02/074491 | 9/2002 |

OTHER PUBLICATIONS

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die– and Wafer–level ILD Thickness Variation in CMP Processes." Washington, D.C.: International Electron Devices Meeting.

Smith, Taber, Duane Boning, James Moyne, Arnon Hurwitz, and John Curry. Jun. 1996. "Compensating for CMP Pad Wear Using Run by Run Feedback Control." Santa Clara, California: VLSI Multilevel Interconnect Conference.

Jul. 5, 2001. "Motorola and Advanced Micro Devices Buy ObjectSpace Catalyst Advanced Process Control Product for Five Wafer Fabs." Semiconductor FABTECH. www.semi-conductorfabtech.com/industry.news/9907/20.07.shtml.

Oct. 15, 2001. Search Report prepared by the Austrian Patent Office for Singapore Patent Application No. 200004286–1.

Johnson, Bob. Jun. 10, 2002. "Advanced Process Control Key to Moore's Law." Gartner, Inc.

Jul. 9, 2002. International Search Report prepared by the European Patent Office for PCT/US01/24910.

Jul. 29, 2002. International Search Report prepared by the European Patent Office for PCT/US01/27407.

Sonderman, Thomas. 2002. "APC as a Competitive Manufacturing Technology: *AMD's Vision for 300mm*." AEC/APC.

Schmid, Hans Albrecht. 1995. "Creating the Architecture of a Manufacturing Framework by Design Patterns." Austin, Texas: OOPSLA.

Baliga, John. Jul. 1999. "Advanced Process Control: Soon to be a Must." Cahners Semiconductor International. www.semiconductor.net/semiconductor/issues/issues/1999/jul99/docs/feature1.asp.

Feb. 1984. "Method and Apparatus of in Situ Measurement and Overlay Error Analysis for Correcting Step and Repeat Lithographic Cameras." *IBM Technical Disclosure Bulletin*, pp. 4855–4859.

Oct. 1984. "Method to Characterize the Stability of a Step and Repeat Lithographic System." *IBM Technical Disclosure Bulletin*, pp. 2857–2860.

Smith, Stewart, Anthony J. Walton, Alan W. S. Ross, Georg K. H. Bodammer, and T.M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214–222.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285–287.

ACM Research, Inc. 2002. "ACM Ultra ECP® System: Electro–Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

KLA–Tencor Corporation, 2002. "KLA Tencor: Press Release: KLA–Tencor Introduces First Production–Worthy Copper CMP In–Situ Film Thickness and End–point Control System: Multi–Million Dollar Order Shipped to Major CMP Tool Manufacturer." www.kla-tencor.com/news_events/press_releases/press$_{13}$ releases2001/984086002.html.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low–k/Copper Integration by Using Electro–Chemical Polishing." *2002 Symposium on VLSI Technology Digest of Technical Papers*, pp. 32–33.

Cunningham, James A. 2003. "Using Electrochemistry to Improve Copper Interconnects." <http://www.e–insite.net/semiconductor/index.asp?layout=article&articleid=CA47465>.

Mar. 25, 2003. International Search Report for PCT/US02/24859 prepared by the European Patent Office.

Adams, Bret W., Bogdan Swedek, Rajeev Bajaj, Fritz Redeker, Manush Birang, and Gregory Amico. "Full–Wafer Endpoint Detection Improves Process Control in Copper CMP." *Semiconductor Fabtech*—12$^{th}$ Edition. Applied Materials, Inc., Santa Clara, CA.

Berman, Mike, Thomas Bibby, and Alan Smith. "Review of In Situ & In–line Detection for CMP Applications." *Semiconductor Fabtech*, 8$^{th}$ Edition, pp. 267–274.

"Semiconductor Manufacturing: An Overview." <http://users.ece.gatech.edu/~gmay/overview.html>.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995–1000. St. Louis, Missouri.

ACM Research Inc. 2000. "Advanced Copper Metallization for 0.13 to 0.05 μm & Beyond." <http://acmrc.com/press/ACM–ECP–brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437–443.

Chen, Argon and Ruey–Shan Guo. Feb. 2001. "Aged–Based Double EWMA Controller and Its Application to CMP Processes." *IEEE Transactions on Semiconductor Manufacturing*, vol. 14, No. 1, pp. 11–19.

Tobin, K. W., T.P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K.Z. Tang. May–Jun. 2001. "Precision Motion Control System for Ultra–Precision Semiconductor and Electronic Components Manufacturing (Abstract)." *51$^{st}$ Electronic Components and Technology Conference 2001. Proceedings*, pp. 1372–1379. Orlando, Florida.

Heuberger, U. Sep. 2001. "Coating Thickness Measurement with Dual–Function Eddy–Current & Magnetic Inductance Instrument (Abstract)." *Galvanotechnik*, vol. 92, No. 9, pp. 2354–2366+IV.

Wang, LiRen and Hefin Rowlands. 2001. "A Novel NN–Fuzzy–SPC Feedback Control System." *8$^{th}$ IEEE International Conference on Emerging Technologies and Factory Automation*, pp. 417–423.

Moyne, J., V. Solakhian, A. Yershov, M. Anderson, and D. Mockler–Herbert. Apr.–May 2002. "Development and Deployment of a Multi–Component Advanced Process Control System for an Epitaxy Tool (Abstract)." *2002 IEEE Advanced Semiconductor Manufacturing Conference and Workshop*, pp. 125–130.

Sarfaty, M., A. Shanmugasundram, A. Schwarm, J. Paik, Jimin Zhang, Rong Pan, M. J. Seamons, H. Li, R. Hung, and S. Parikh. Apr.–May 2002. "Advance Process Control Solutions for Semiconductor Manufacturing (Abstract)." *13$^{th}$ Annual IEEE/SEMI Advanced Semiconductor Manufacturing Conference. Advancing the Science and Technology of Semiconductor Manufacturing. ASMC 2002*, pp. 101–106.

Campbell, W. J., S. K. Firth, A. J. Toprac, and T. F. Edgar. May 2002. "A Comparison of Run–to–Run Control Algorithms (Abstract)." *Proceedings of 2002 American Control Conference*, vol. 3, pp. 2150–2155.

Good, Richard and S. Joe Qin. May 2002. "Stability Analysis of Double EWMA Run–to–Run Control with Metrology Delay." *IEEE/CPMT International Electronics Manufacturing Technology Symposium*, pp. 355–363.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67–69.

Boning, Duane S., Jerry Stefani, and Stephanie W. Butler. Feb. 1999. "Statistical Methods for Semiconductor Manufacturing." *Encyclopedia of Electrical Engineering*. J. G. Webster, Ed.

McIntosh, John. Mar. 1999. "Using CD–SEM Metrology in the Manufacture of Semiconductors (Abstract)." *JOM*, vol. 51, No. 3, pp. 38–39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164–166.

Meckl, P. H and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725–729. Kohala Coast, HI.

Khan, K., C. El Chemali, J. Moyne, J. Chapple–Sokol, R. Nadeau, P. Smith, C., and T. Parikh. Oct. 1999. "Yield Improvement at the Contact Process Through Run–to–Run Control (Abstract)." *24th IEEE/CPMT Electronics Manufacturing Technology Symposium*, pp. 258–263.

Ruegsegger, Steven, Aaron Wagner, James S. Freudenberg, and Dennis S. Grimard. Nov. 1999. "Feedforward Control for Reduced Run–to–Run Variation in Microelectronics Manufacturing." *IEEE Transactions on Semiconductor Manufacturing*, vol. 12, No. 4.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model–Based Control in Microelectronics Manufacturing." *Proceedings of the 38th IEEE Conference on Decision and Control*, Phoenix, Arizona, vol. 4, pp. 4185–4191.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232–237.

Oechsner, R., T. Tschaftary, S. Sommer, L. Pfitzner, H. Ryssel, H. Gerath, C. Baier, and M. Hafner. Sep. 2000. "Feed–forward Control for a Lithography/Etch Sequence (Abstract)." *Proceedings of the SPIE—The International Society for Optical Engineering Conference*, vol. 4182, pp. 31–39.

Cheung, Robin. Oct. 18, 2000. "Copper Interconnect Technology." *AVS/CMP User Group Meeting*, Santa Clara, CA.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, n. 11.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical–Mechanical Polishing." *IEEE Transactions on Components, Packaging, and Manufacturing Technology—Part C*, vol. 19, No. 4, pp. 307–314.

Zhe, Ning, J. R. Moyne, T. Smith, D. Boning, E. Del Castillo, Yeh Jinn–Yi, and Hurwitz. Nov. 1996. "A Comparative Analysis of Run–to–Run Control Algorithms in Semiconductor Manufacturing Industry (Abstract)." *IEEE/SEMI 1996 Advanced Semiconductor Manufacturing Conference Workshop*, pp. 375–381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control*, vol. 2, pp. 1229–1233. Kobe, Japan.

Fan, Jr–Min, Ruey–Shan Guo, Shi–Chung Chang, and Kian–Huei Lee. 1996. "Abnormal Tred Detection of Sequence–Disordered Data Using EWMA Method." *IEEE/SEMI Advanced Semiconductor Manufacturing Conference*, pp. 169–174.

Smith, Taber and Duane Boning. 1996. "A Self–Tuning EWMA Controller Utilizing Artificial Neural Network Function Approximation Techniques." *IEEE/CPMT International Electronics Manufacturing Technology Symposium*, pp. 355–363.

Guo, Ruey–Shan, Li–Shia Huang, Argon Chen, and Jin-–Jung Chen. Oct. 1997. "A Cost–Effective Methodology for a Run–by–Run EWMA Controller." *6th International Symposium on Semiconductor Manufacturing*, pp. 61–64.

Mullins, J. A., W. J. Campbell, and A. D. Stock. Oct. 1997. "An Evaluation of Model Predictive Control in Run–to–Run Processing in Semiconductor Manufacturing (Abstract)." *Proceedings of the SPIE—The International Society for Optical Engineering Conference*, vol. 3213, pp. 182–189.

Reitman, E. A., D. J. Friedman, and E. R. Lory. Nov. 1997. "Pre–Production Results Demonstrating Multiple–System Models for Yield Analysis (Abstract)." *IEEE Transactions on Semiconductor Manufacturing*, vol. 10, No. 4, pp. 469–481.

Durham, Jim and Myriam Roussel. 1997. "A Statistical Method for Correlating In–Line Defectivity to Probe Yield." *IEEE/SEMI Advanced Semiconductor Manufacturing Conference*, pp. 76–77.

Shindo, Wataru, Eric H. Wang, Ram Akella, and Andrzej J. Strojwas. 1997. "Excursion Detection and Source Isolation in Defect Inspection and Classification." *2nd International Workshop on Statistical Metrology*, pp. 90–93.

July 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217–224.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76–78.

Spanos, Costas J., Hai–Fang Guo, Alan Miller, and Joanne Levine–Parrill. Nov. 1992, "Real–Time Statistical Process Control Using Tool Data." *IEEE Transactions on Semiconductor Manufacturing*, v. 5, n. 4, pp. 308–318.

Feb. 1993, "Electroless Plating Scheme to Hermetically Seal–Copper Features." *IBM Technical Disclosure Bulletin*, pp. 405–406.

Scarr, J. M. and J. K. Zelisse, Apr. 1993. "New Topology for Thickness Monitoring Eddy Current Sensors (Abstract)." *Proceedings of the 36th Annual Technical Conference*, Dallas, Texas.

Matsuyama, Akira and Jessi Niou, 1993. "A State of–t–he–Art Automation System of an ASIC Wafer Fab in Japan." *IEEE/SEMI International Semiconductor Manufacturing Science Syposium*, pp. 42–47.

Yeh, C. Eugene, John C. Cheng, and Kwan Wong, 1993. "Implementation Challenges of a Feedback Control System for Wafer Fabrication." *IEEE/CHMT International Electronics Manufacturing Technology Symposium*, pp. 438–442.

Kurtzberg, Jerome M. and Menachem Levanoni, Jan. 1994. "ABC: A Better Control for Manufacturing." *IBM Journal of Research and Development*, v. 38, n. 1, pp. 11–30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1–11.

Muller–Heinzerling, Thomas, Ulrich Neu, Hans Georg Nurnberg, and Wolfgang May. Mar. 1994. "Recipe–Controlled Operation of Batch Processes with Batch X." *ATP Automatisierungstechnische Praxis*, vol. 36, No. 3, pp. 43–51.

Stoddard, K., P. Crouch, M. Kozicki, and K. Tsakalis, Jun.–Jul. 1994. "Application of Feedforward and Adaptive Feedback Control to Semiconductor Device Manufacturing (Abstract)." *Proceedings of 1994 American Control Conference—ACC '94*, vol. 1, pp. 892–896. Baltimore, Maryland.

Schaper, C. D., M. M. Moslehi, K. C. Saraswat, and T. Kailath, Nov. 1994. "Modeling, Identification, and Control of Rapid Thermal Processing Systems (Abstract)." *Journal of the Electrochemical Society*, vol. 141, No. 11, pp. 3200–3209.

Tao, K. M., R. L. Kosut, M. Ekblad, and G. Aral, Dec. 1994. "Feedforward Learning Applied to RTP of Semiconductor Wafers (Abstract)." *Proceedings of the 33rd IEEE Conference on Decision and Control*, vol. 1, pp. 67–72. Lake Buena Vista, Florida.

Hu, Albert, He Du, Steve Wong, Peter Renteln, and Emmanuel Sachs, 1994. "Application of Run by Run Controller to the Chemical–Mechanical Planarization Process." *IEEE/CPMT International Electronics Manufacturing Technology Symposium*, pp. 371–378.

Spanos, C. J., S. Leang, S.-Y. Ma, J. Thomson, B. Bombay, and X. Niu, May 1995. "A Multistep Supervisory Controller for Photolithographic Operations (Abstract)." *Proceedings of the Symposium on Process Control, Diagnostics, and Modeling in Semiconductor Manufacturing*, pp. 3–17.

Leang, Sovarong, Shang–Yi Ma, John Thomson, Bart John Bombay, and Costas J. Spanos. May 1996. "A Control System for Photolithographic Sequences." *IEEE Transactions on Semiconductor Manufacturing*, vol. 9, No. 2.

Ostanin, Yu. Ya. Oct. 1981. "Optimization of Thickness Inspection of Electrically Conductive Single–Layer Coatings with Laid–on–Eddy–Current Transducers (Abstract)." *Defektoskopiya*, Vol. 17, No. 10, pp. 45–52. Moscow, USSR.

Feb. 1984. "Substrate Screening Process." *IBM Technical Disclosure Bulletin*, pp. 4824–4825.

Herrmann, D. 1988. "Temperature Errors and Ways of Elimination for Contactless Measurement of Shaft Vibrations (Abstract)." *Technisches Messen™*, vol. 55, No. 1, pp. 27–30. West Germany.

Lin, Kuang–Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216–229.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43–51.

Larrabee, G. B. May 1991. "The Intelligent Microelectronics Factory of the Future (Abstract)." *IEEE/SEMI International Semiconductor Manufacturing Science Symposium*, pp. 30–34. Burlingame, CA.

Burke, Peter A. Jun. 1991. "Semi–Empirical Modelling of SiO2 Chemical–Mechanical Polishing Planarization," *VMIC Conference, 1991 IEEE*, pp. 379–384. IEEE.

Levine, Martin D. 1985, *Vision in Man and Machine*. New York: McGraw–Hill, Inc. pp. ix–xii, 1–58.

Pilu, Maurizio. Sep. 2001. "Undoing Page Curl Distortion Using Applicable Surfaces." *IEEE International Conference on Image Processing*, Thessalonica, Greece.

May 23, 2003. Written Opinion for PCT/US01/24910.

Williams, Randy, Dadi Gudmundsson, Kevin Monahan, Raman Nurani, Meryl Stoller and J. George Shanthikumar, Oct. 1999. "Optimized Sample. Planning for Wafer Defect Inspection," *Semiconductor Manufacturing Conference Proceedings, 1999 IEEE International Symposium on Santa Clara, CA*, Piscataway, NJ. pp. 43–46.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 20, 2003. Written Opinion for PCT/US01/22833.

El Chemali, Chadi et al. Jul./Aug. 2000. "Multizone uniformity control of a chemical mechanical polishing process utilizing a pre– and postmeasurement strategy." *J. Vac. Sci. Technol.* vol. 18, No. 4, pp. 1287–1296.

Mar. 5, 2001. "KLA–Tencor Introduces First Production–worthy Copper CMP In–situ Film Thickness and End–point Control System," http://www.kla–tencor.com/j/servlet/NewsItem?newsItemID=74.

2002. "Microsense II—5810: Non–Contact Capacitance Gaging Module." www.adetech.com.

Aug. 8, 2003. PCT International Search Report from PCT/US03/08513.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

"NanoMapper wafer nanotopography measurement by ADE Phase Shift." http://www.phase–shift.com/nanomap.shtml.

"Wafer flatness measurement of advanced wafers." http://www.phase–shift.com/wafer–flatness.shtml.

"ADE Technologies, Inc.—6360," http://www.adetech.com/6360.shtml.

"3D optical profilometer MicroXAM by ADE Phase Shift." http://www.phase–shift.com/microxam.shtml.

"NanoMapper FA factory automation wafer nanotopography measurement." http://www.phase–shift.com/nanomapperfa.shtml.

Miller, G. L., D. A. H. Robinson, and J. D. Wiley, Jul. 1976. "Contactless measurement of semiconductor conductivity by radio frequency–free–carrier power absorption." *Rev. Sci. Instrum.*, vol. 47, No. 7, pp. 799–805.

1999. "Contactless Bulk Resistivity/Sheet Resistance Measurement and Mapping Systems." www.Lehighton.com/fabtech1/index.html.

2000. "Microsense II Capacitance Gaging System." www.adetech.com.

Rocha, Joao and Carlos Ramos. Sep. 12, 1994. "Task Planning for Flexible and Agile Manufacturing Systems." Intelligent Robots and Systems '94. Advanced Robotic Systems and the Real World, IROS '94. Proceedings of the IEEE/RSJ/GI International Conference on Munich, Germany Sep. 12–16, 1994. New York, New York: IEEE. pp. 105–112.

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Jun. 20, 2002. Office Action for U.S. Appl. No. 09/619,044, filed Jul. 19, 2000.

Sep. 26, 2002. Office Action for U.S. Appl. No. 09/637,620, filed Aug. 11, 2000.

Oct. 23, 2002. Office Action for U.S. Appl. No. 09/469,227, filed Dec. 22, 1999.

Dec. 17, 2002. Office Action for U.S. Appl. No. 09/363,966, filed Jul. 29, 1999.

Feb. 10, 2003. Office Action for U.S. Appl. No. 09/619,044, filed Jul. 19, 2000.

May 8, 2003. Office Action for U.S. Appl. No. 09/637,620, filed Aug. 11, 2000.

Jun. 18, 2003. Office Action for U.S. Appl. No. 09/655,542, filed Sep. 6, 2000.

Aug. 8, 2003. International Search Report for PCT/US03/08513.

Aug. 25, 2003. Office Action for U.S. Appl. No. 10/100,184, filed Mar. 19, 2002.

Nov. 5, 2003. Office Action for U.S. Appl. No. 10/172,977, filed Jun. 18, 2002.

Dec. 1, 2003. Office Action for U.S. Appl. No. 10/173,108, filed Jun. 18, 2002.

Dec. 11, 2003. Office Action for U.S. Appl. No. 09/943,383, filed Aug. 31, 2001.

Dec. 16, 2003. International Search Report for PCT/US03/23964.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Nov. 17, 2004. Written Opinion for PCT Ser. No. PCT/US01/27407.

Rauf, Shahid and Mark J. Kushner, Aug. 1998. "Virtual Plasma Equipment Model: A Tool for Investigating Feedback Control in Plasma Processing Equipment." *IEEE Transactions on Semiconductor Manufacturing*. vol. 11, No. 3. pp. 486–494.

Rauf, Shahid and Mark J. Kushner. May/Jun. 1999. "Controller design issues in the feedback control of radio frequency plasma processing reactors." *J. Vac. Sci. Technol. A*. vol. 17, No. 3, pp. 704–712.

Cruden, Brett et al. "Chemical Vapor Deposition (CVD) of Teflon & trade–like Films for Use in Low–k Interlayer Dielectric Applications." http://plasma–processing.com/chemvap.

Kim, Jiyoun et al. "Gradient and Radial Uniformity Control of a CMP Process Utilizing a Pre–and Post–Measurement Strategy." *University of Michigan, Electrical Engineering and Computer Science Department*.

Nov. 11, 2004, International Search Report for PCT Ser. No. PCT/US03/36501.

Boning, Duane, William Moyne, Taber Smith, James Moyne, Roland Telfeyan, Arnon Hurwitz, Scott Shellman, and John Taylor. Oct. 1996. "Run by Run Control of Chemical–Mechanical Polishing." *IEEE Trans. CPMT* (C). vol. 19, No. 4, pp. 307–314.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567–1603, 2000.

Chemali, Chadi El, James Moyne, Kareemullah Khan, Rock Nadeau, Paul Smith, John Colt, Jonathan Chapple–Sokol, and Tarun Parikh. Nov. 1998. "Multizone Uniformity Control of a CMP Process Utilizing a Pre and Post–Measurement Strategy." Seattle, Washington: SEMETECH Symposium.

Moyne, James. Oct. 1999. "Advancements in CMP Process Automation and Control." Hawaii: (Invited paper and presentation to) Third International Symposium on Chemical Mechanical Polishing in IC Device Manufacturing: 196th Meeting of the Electrochemical Society.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

NovaScan 2020. Feb. 2002. "Superior Integrated Process Control for Emerging CMP High–End Applications.".

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126–132.

Hu, Albert, He Du, Steve Wong, Peter Renteln, and Emanuel Sachs. 1994. "Application of Run by Run Controller to the Chemical–Mechanical Planarization Process." IEEE/CPMT International Electronics Manufacturing Technology Symposium. pp. 371–378.

Smith, Taber, Duane Boning, James Moyne, Arnon Hurwitz, and John Curry. Jun. 1996. "Compensating for CMP Pad Wear Using Run by Run Feedback Control." Proceedings of the Thirteenth International VLSI Multilevel Interconnection Conference. pp. 437–439.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1–10.

Klein, Bruce. Jun. 1999. "Application Development: XML Makes Object Models More Useful." informationweek. pp. 1A–6A.

Chemali, Chadi El, James Moyne, Kareemullah Khan, Rock Nadeau, Paul Smith, John Colt, Jonathan Chapple–Sokol, and Tarun Parikh. Jul./Aug. 2000. "Multizone Uniformity Control of a Chemical Mechanical Polishing Process Utilizing a Pre– and Postmeasurement Strategy." J. Vac. Sci. Technol. A, vol. 18(4). pp. 1287–1296. American Vacuum Society.

Jensen, Alan, Peter Renteln, Stephen Jew, Chris Raeder, and Patrick Cheung. Jun. 2001. "Empirical–Based Modeling for Control of CMP Removal Uniformity." Solid State Technology, vol. 44, No. 6, pp. 101–102, 104, 106. Cowan Publ. Corp.: Washington, D.C.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr./May 2002. "Advance Process Control Solutions for Semiconductor Manufacturing." IEEE/SEMI Advanced Semiconductor Manufacturing Conference. pp. 101–106.

Oct. 4, 2002. International Search Report from PCT/US01/22833.

Oct. 23, 2002. International Search Report from PCT/US01/27406.

Nov. 7, 2002. International Search Report from PCT/US02/19061.

Nov. 11, 2002. International Search Report from PCT/US02/19117.

Nov. 12, 2002. International Search Report from PCT/US02/19063.

Sep. 16, 2004. International Preliminary Examination Report for PCT Ser. No. PCT/US02/24859.

IslamRaja, M. M., C. Chang, J. P. McVittie, M. A. Cappelli, and K. C. Saraswat. May/Jun. 1993. "Two Precursor Model for Low–Pressure Chemical Vapor Deposition of Silicon Dioxide from Tetraethylorthosilicate." *J. Vac. Sci. Technol. B*, vol. 11, No. 3, pp. 720–726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3–4, pp. 315–326.

Sun, S.C. 1998. "CVD and PVD Transition Metal Nitrides as Diffusion Barriers for CU Metallization." IEEE. pp. 243–246.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16–17, 1998. "A Real–Time Equipment Monitoring and Fault Detection System." *Semiconductor Manufacturing Technology Workshop*, pp. 111–121.

Lantz, Mikkel. 1999. "Equipment and APC Integration at AMD with Workstream." IEEE, pp. 325–327.

Tagami, M., A. Furuya, T. Onodera, and Y. Hayashi. 1999. "Layered Ta–nitrides (LTN) Barrier Film by Power Swing Sputtering (PSS) Technique for MOCVD–Cu Damascene Interconnects." IEEE. pp. 635–638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I–PVD TA(N) Barrier in Dual Damascene" (Abstract). *Advanced Metallization Conference 2000*. San Diego, CA.

Eisenbraun, Eric, Oscar van der Straten, Yu Zhu, Katharine Dovidenko, and Alain Kaloyeros. 2001, "Atomic Layer Deposition (ALD) of Tantalum–Based Materials for Zero Thickness Copper Barrier Applications" (Abstract). IEEE. pp. 207–209.

Smith, S.R., K.E. Elers, T. Jacobs, V. Blaschke, and K. Pfeifer, 2001. "Physical and Electrical Characterization fo ALD Tin Used as a Copper Diffusion Barrier in 0.25 mum, Dual Damascene Backend Structures" (Abstract). *Advanced Metallization Conference 2001*. Montreal, Quebec.

Kim, Y.T. and H. Sim. 2002. "Characteristics of Pulse Plasma Enhanced Atomic Layer Deposition of Tungsten Nitride Diffusion Barrier for Copper Interconnet" (Abstract). *IEIC Technical Report*. vol. 102, No. 178, pp. 115–118.

Elers, Kai–Erik, Ville Saanila, Pekka J. Soininen, Wei–Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13–14, pp. 149–153.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." IEEE. pp. 603–606.

Van der Straten, O., Y. Zhu, E. Eisenbraun, and A. Kaloyeros. 2002. "Thermal and Electrical Barrier Performance Testing of Ultrathin Atomic Layer Deposition Tantalum–Based Materials for Nanoscale Copper Metallization." IEEE. pp. 188–190.

Wu, Z.C., Y.C. Lu, C.C.Chiang, M.C. Chen, B.T.Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65–nm BEOL Technology." IEEE. pp. 595–598.

Jul. 25, 2003. International Search Report for PCT/US02/24858.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928,474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2002.

Jul. 15, 2004. Office Action for U.S. Appl. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Ser. No. PCT/US02/19063.

Aug. 18, 2004. International Preliminary Examination Report for PCT Ser. No. PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Ser. No. PCT/US02/21942.

Sep. 15, 2004. Office Action for U.S. Appl. No. 10/632,107, filed Aug. 1, 2003.

Sep. 29, 2004. Office Action for U.S. Appl. No. 09/363,966, filed Jul. 29, 1999.

Oct. 1, 2004. International Preliminary Examination Report for PCT Ser. No. PCT/US03/23964.

Oct. 6, 2004. Office Action for U.S. Appl. No. 10/759,108, filed Jan. 20, 2004.

Oct. 12, 2004. International Preliminary Examination Report for PCT Ser. No. PCT/US02/19061.

\* cited by examiner

EXPERIMENT MANAGEMENT SYSTEM, METHOD AND MEDIUM

BACKGROUND OF THE INVENTION

1. Field of the Invention

The present invention concerns computer-related methods systems and mediums for managing experiments. More specifically, it relates to managing experiments concerning changes in a process, for example processes for controlling semiconductor technology manufacture.

2. Related Art

Machines, materials and processes in most industries are becoming increasingly complex and costly. Meanwhile, a need has arisen for the continuing improvement of processes and of machine and material quality.

Semiconductors and other products are typically manufactured under control of pre-defined processes. These pre-defined processes may be highly complex. For example, a pre-defined manufacturing process for producing semiconductor chips might contain five hundred to seven hundred and fifty steps. Moreover, each of these steps might have several variables, for example six variables, that are significant.

In order to improve manufacturing or test theories, it is often desirable to perform experiments by changing some small portion of the base manufacturing process. For example, an engineer might want to make one of the layers on a semiconductor ten percent thicker. This might entail performing the recipe for that step for an extra 15 seconds, with perhaps some adjustments in subsequent steps. Typically the engineer does not create a new base process including the modifications to adapt to the desired test, since that would be too time consuming.

Unfortunately, such an experiment using conventional techniques requires manual intervention and manual tracking of results. Accordingly, the engineer or operator performing the experiment would obtain a number of semiconductor chips and process them outside of an automated (e.g., production or mock-production manufacturing) environment. Thus, the products on which the experiment is performed need to be removed from the automated environment, which is both time-consuming and allows for the potential introduction of extraneous factors which may ultimately (and inadvertently) affect the results of the experiment. In addition, such removal of the semiconductor chips makes it difficult to coordinate manual tracking of changes or experiment history, and to control experiments and to analyze overall results.

Consequently, for research and development engineers, operators and other users working in factory settings, there remains a need for experiments on changes to existing processes to be flexible, easy and traceable.

SUMMARY OF THE INVENTION

The present invention alleviates the problems of the conventional techniques described above by providing systems, methods and mediums for automating experiments within an automated (e.g., production or mock-production manufacturing) environment without the need to disassociate the test subject (e.g., the semiconductor chip or chips) from that environment. An "experiment," according to at least some embodiments of the present invention, is a pre-planned deviation of at least some portion of an established (e.g., pre-defined) process utilizing the automated environment.

According to at least some embodiments of the present invention, experimentation begins with an experiment order (i.e., request to initiate an experiment), which is first originated as an informal request, submitted to a computerized system, routed through various defined users, perhaps modified, and ultimately approved. In facilitating the implementation of the requested experiment, experiment management includes four conceptually distinct stages: order management, setup, execution, and analysis. The order management component of the invention assists in automatically navigating the formalization of the experiment order (mentioned above) and tracking the experiment. The setup stage typically handles the manual or automated translation of the experiment from the generalized statements, requirements, or proposed results into data defining a specific process ready to execute by the automated environment. The execution stage includes the execution of the experiment itself via the automated environment based on the process data, including the collection of experiment results. In the analysis stage, results of the experiment are reported and analyzed.

In accordance with at least some embodiments of the present invention, in operation, an experiment order is received, the experiment order including at least some deviation from a base process capable of operating in an automated environment. An approval of the experiment order is then obtained. At least a portion of the experiment order is translated into processing data suitable for implementation by said automated environment, and stored. The experiment is caused to be executed in conjunction with at least some portion of said base process via the automated environment according to the processing data.

Further, the invention may include storing data defining the experiment order, distributing the experiment order to a plurality of users, obtaining changes to the experiment order from at least one of the users, and receiving the approval for the experiment order from at least one user. Moreover, documents may be attached to the experiment request.

Additionally, information indicating a state change of the experiment request may be published, responsive to a document attached to the experiment request or to a change in state of the experiment order.

Moreover, the experiment may produce at least one test product and at least one production product (i.e., a control, which could be, e.g., a product which was processed before or after the test product, and which was processed according to the base process); the processing data may include an indication of the base process, the changes to the base process, and a split-off of a control set (i.e., the products subject to the experiment); and the split-off of a control set may produce the at least one production product according to the base process and the changes to the base process may produce the at least one test product. The results of the execution of the experiment may be stored.

BRIEF DESCRIPTION OF THE FIGURES

The above mentioned and other advantages and features of the present invention will become more readily apparent from the following detailed description in the accompanying drawings, in which.

DETAILED DESCRIPTION

The following detailed description includes many specific details. The inclusion of such details is for the purpose of illustration only and should not be understood to limit the invention. Throughout this discussion, similar elements are referred to by similar numbers in the various figures for ease of reference.

As indicated above in the Summary section, an "experiment," according to at least some embodiments of the present invention, is a pre-planned deviation of at least some portion of a base process utilizing an automated environment. Typically an experiment is performed on materials, such as semiconductor chips, that are produced as a result of the automated process. Also as indicated above, at least some embodiments of the present invention envision that experiment management includes four conceptually distinct stages: order management, setup, execution, and analysis. Although these stages are conceptually distinct, they may temporally overlap.

According to at least some embodiments of the present invention, reports, memos, forms, files, and other documents may be associated with a particular experiment throughout the order management and setup stages. These may be reviewed by users allowed access to the experiment. This permits users and reviewers to comment on the experiment, provide background information, provide appropriate forms, attach relevant information, etc., in a user-friendly, highly flexible fashion. Due to its flexibility, it invites users to provide input and should result in higher quality experiments.

Figure 1:
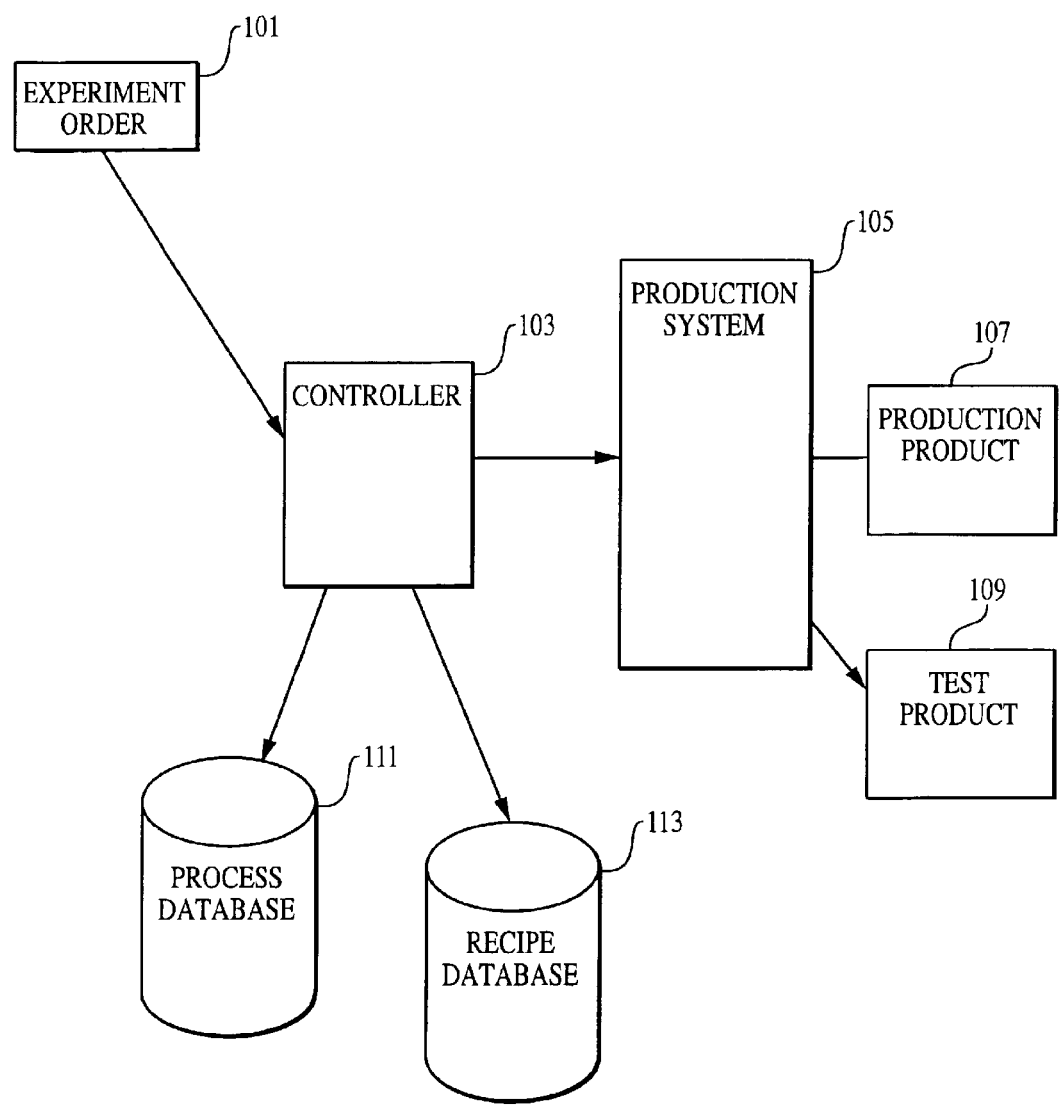
FIG. 1 is a block diagram of a computerized process control system which may be used in connection with at least some embodiments of the present invention.

Reference is now made to FIG. 1, a block diagram generally illustrating a computerized process control system which may be used in connection with at least some embodiments of the present invention. As is illustrated, the experiment order 101 is input to a computerized system, referred to generally as a controller 103. The experiment order 101 contains a description, such as in text, of a desired experiment. The experiment order 101 could be, for example, a word processing document containing text. As one alternative, it could be input from a menu. The experiment described in the experiment order 101 is a deviation from an existing automated process for creating a product, although it is not necessarily described in the order as a deviation from a particular process.

The controller 103 has access to various stored processes 111, such as manufacturing processes for semiconductor chips. The controller 103 could be a general purpose computer, or a special purpose computer specially programmed, or other automated system or distributed system. (In general, such computers as used here, or whose use may be apparent from the context of the discussion, can be any number of different types of computers, including those containing processors from Intel Corporation of Santa Clara, Calif., wherein these computers can contain any number and different types of storage devices serving as computer-readable mediums; in addition, it is contemplated by at least some embodiments of the present invention that the computer-readable medium be a transmission). The stored processes 111 comprise a number of automated steps in a manufacturing process. The actual format of the contents of these steps is defined by the system and devices in the system. Some of the steps in the processes utilize recipes, stored in a recipe database 113. Recipes may be shared by various processes. The controller 103 controls the processing of an automated environment such as production system 105, which ultimately produces production products 107, or following an experiment, produces test products 109. The invention thereby allows users to submit experiment requests, create derivations of base processes, and to track the status of experiment requests.

Figure 2:
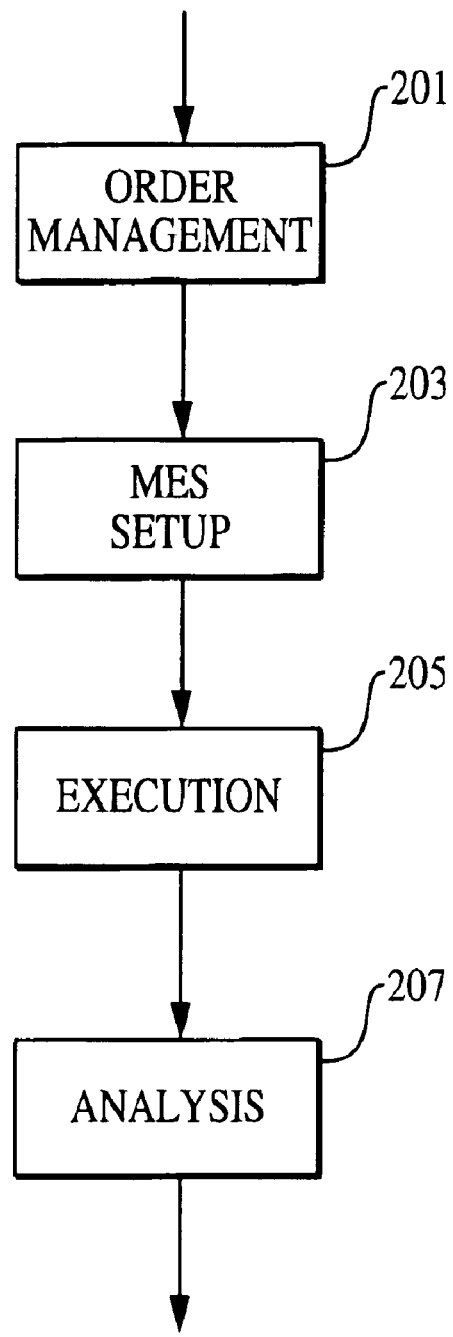
FIG. 2 is a flow chart of an overall process for experiment management according to at least some embodiments of the invention.

Reference is made to FIG. 2, a flow chart of an overall process for experiment management according to at least some embodiments of the present invention. The four conceptual stages (as mentioned above) included: order management 201, Manufacturing Execution System (MES) setup 203, execution 205, and analysis 207.

At the order management stage 201, further defined below, the experiment order is defined. Typically, an experiment would be defined in the experiment order as a set of requirements, and may be specified as a deviation from an existing process. The experiment order is subject to routing, review, and change by various personnel, prior to being approved for the next stage.

At the MES setup stage 203, the experiment order is translated into the experiment setup, that is, specific processing data which can be executed by components in the production system. The processing data is in a format which is expected by the production system components. In typical situations, data to execute the experiment is interjected between (and/or replaces existing) steps of a base process.

At the execution stage 205, the execution of materials is performed, based on the experiment setup. Most or all of this stage is performed automatically by the production system components. The results of each step in the setup implemented at this execution stage 203 are recorded.

At the analysis stage 207, the results of the experiment are reported and analyzed. This may be done automatically by a computer, and/or may include analysis by the user.

Figure 3A:
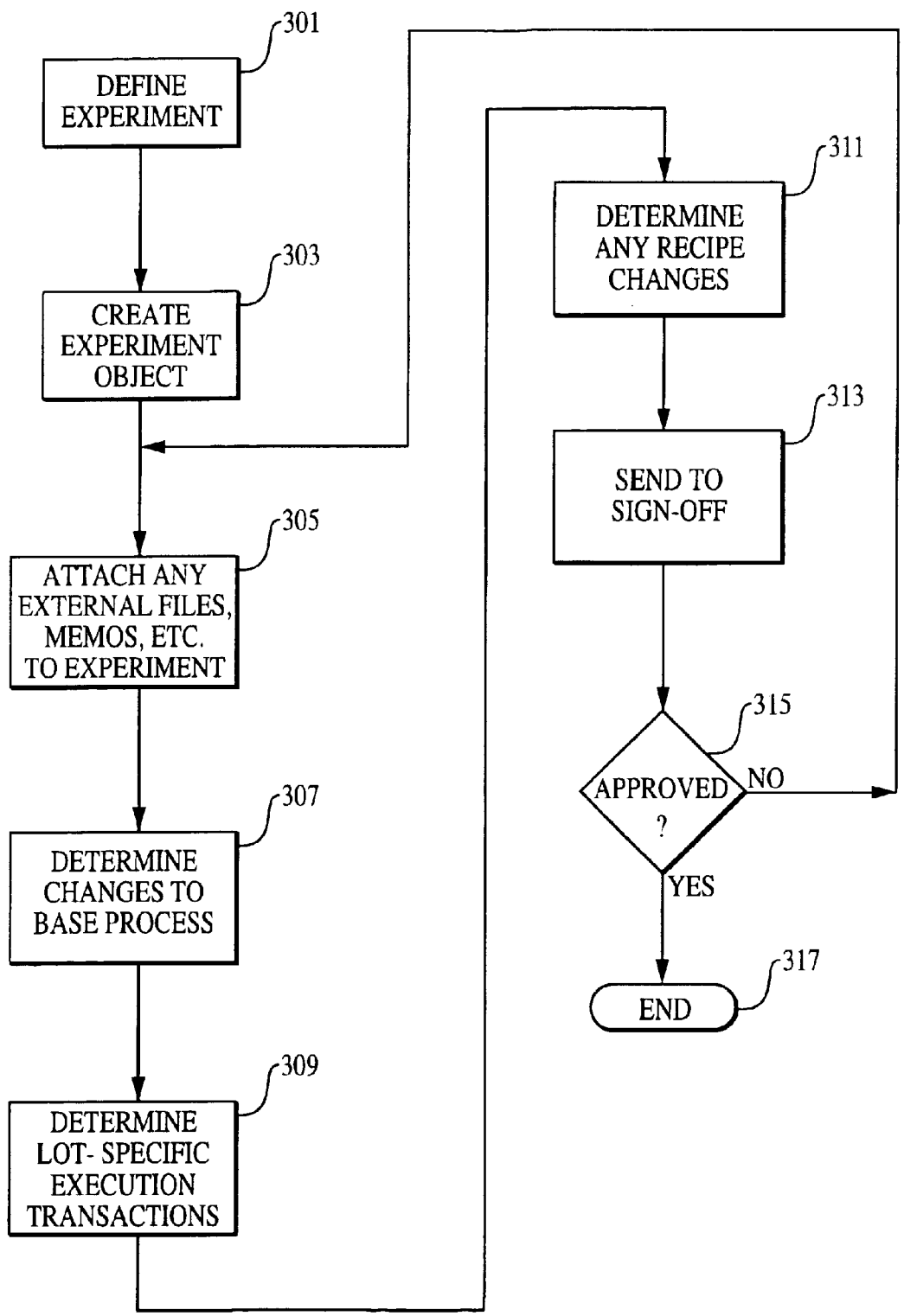
FIGS. 3A and B are a flow chart of an order management process portion of the overall process of FIG. 2.
Figure 3B:
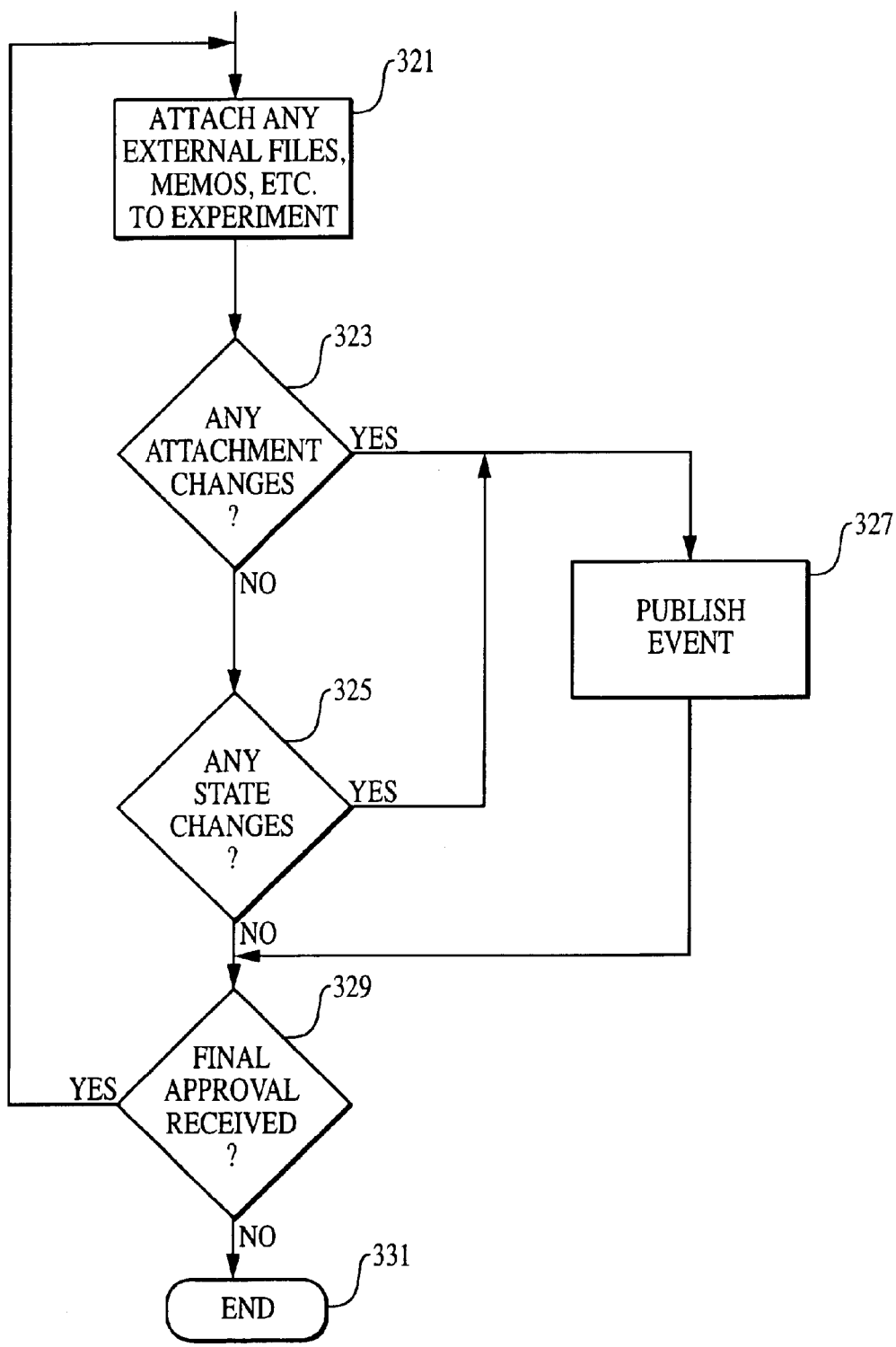

Reference is made to FIGS. 3A and 3B, a flow chart of an example order management stage 201 of the overall process of FIG. 2, as envisioned by at least some embodiments of the present invention. This stage allows the experiment to be requested and be performed following experiment request review and sign-off. At step 301, the experiment is initially defined by a requestor. In order to facilitate experiments, it is envisioned that requests can be submitted in any appropriate form. One appropriate form is a textual description in an electronic document. Note that the experiment may be informally described. It is not necessary for the initial experiment request to define the experiment as a variation from an existing process.

At step 303, the experiment object (or other storage for experiment data) is created. Initial information is collected to identify the requestor and the experiment. The information is stored, such as in an object. The experiment request is then distributed to appropriate users identified in a distribution list.

At step 305, a user who received the experiment request (e.g., for review) may attach external files, memos, forms, or other documents to the experiment request. The ability to associate documents with the experiment request can be used to facilitate user interaction concerning the experiment request. These documents may then be reviewed by other users. At step 307, the user (or automated entity) determines the changes to be made to a particular base process. The user (or automated entity) may also determine the base process which is to be modified. Also, at step 309, the user (or automated entity) will determine when to split off a lot from the control set, and the lot-specific transactions that are to be made. At step 311, the user (or automated entity) determines what recipe changes, if any, need to be made. Having determined the specified changes to be made to the base process, the system receives and stores the changes as processing data. At step 313, the experiment, as it has been tweaked by the users, is sent for sign-off, described in FIG. 3B. At step 315, if the experiment has been approved by the users, the process ends 317 and the experiment proceeds to the next conceptual stage. Otherwise, the process returns to step 305 for further handling.

FIG. 3B illustrates one embodiment of the sign-off process. At step 321, a user who received the experiment request (e.g., for review) may attach external files, memos, forms, or other documents to the experiment request, which may then be reviewed by other users. At step 323, if documents are attached or deleted to the experiment request, or at step 325 if there was a state change for the experiment request, such information is published 327. One appropriate method for publication is to send such information to listed users via e-mail. A state change would include, for example, a "sign-off" on the experiment (or portion thereof). At step 329, if an indication of final approval (or affirmative lack of approval) has not been received, the process repeats at step 321. If final approval has been received, the stage is ended 331.

Figure 4:
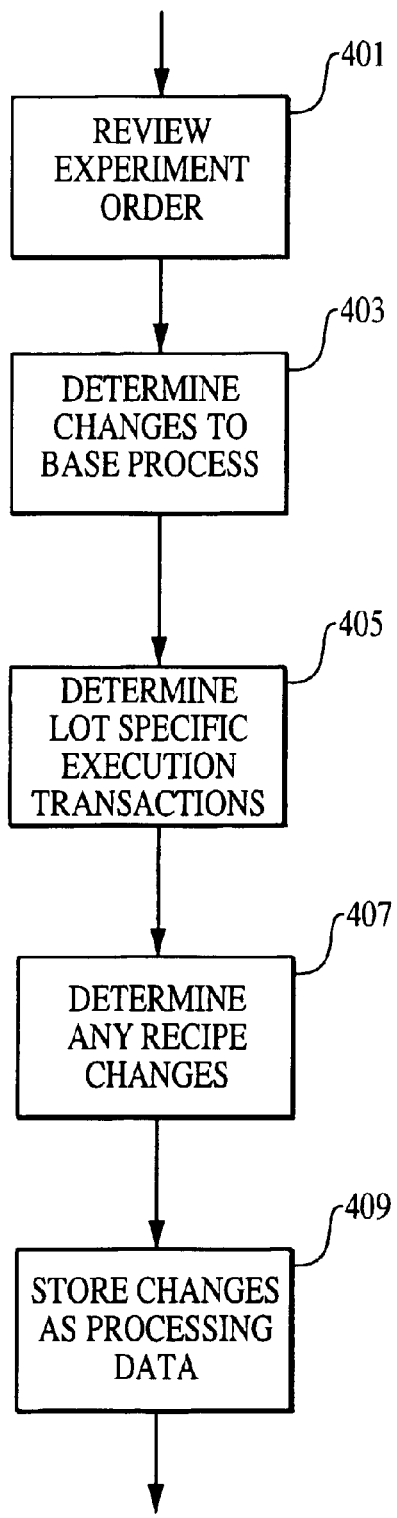
FIG. 4 is a flow chart of a setup process portion of the overall process of FIG. 2.

Reference is made to FIG. 4, a flow chart of a setup stage 203 portion of the overall process of FIG. 2. During the setup stage, a user can set up the particular experiment. For example, a user could set up experiment-specific data, for example a reticle or recipe details. At step 401, a user (or automated entity) retrieves and reviews the experiment order. As indicated above, the experiment order may be an informal description of an experiment. A user can determine how a process should be implemented to effect the requested experiment, or the process can be automated, for example, by parsing the description of the experiment and identifying certain key words or phrases that are indicative of what is requested. At least some embodiments of the present invention envision that this can be done utilizing, e.g., various expert system techniques. At least some embodiments of the present invention also envision some combination of automation and user participation.

Still referring to FIG. 4, at step 403, the user (or automated entity) determines the changes to be made to a particular base process. The user (or automated entity) may also determine the base process which is to be modified. Also, at step 405, the user (or automated entity) will determine when to split off a lot from the control set, and the lot-specific transactions that are to be made. At step 407, the user (or automated entity) determines what recipe changes, if any, need to be made. Having determined the specified changes to be made to the base process, the system receives and stores the changes as processing data.

Figure 5:
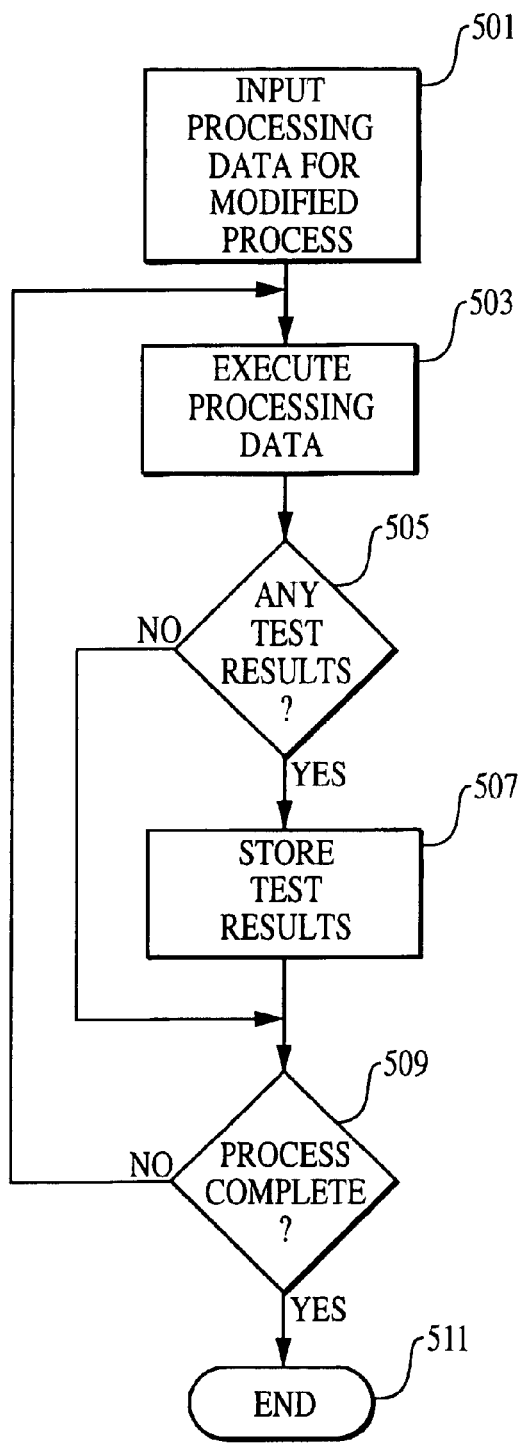
FIG. 5 is a flow chart of an execution process portion of the overall process of FIG. 2.

Reference is made to FIG. 5, a flow chart of an execution stage 205 of the overall process of FIG. 2. At this point, the experiment has been defined in processing data which can be input to the automated environment. The experiment can then be processed in a manner which is transparent to the automated environment. At step 501, the automated environment receives the processing data for the modified process. At step 503, the automated environment executes a step of the processing data. If there are any test results to be stored, at steps 505–507, the system stores the test results. At step 509, if processing is not complete, the automated environment returns to continue processing at step 503. When processing is complete, this stage ends at step 511.

Figure 6:
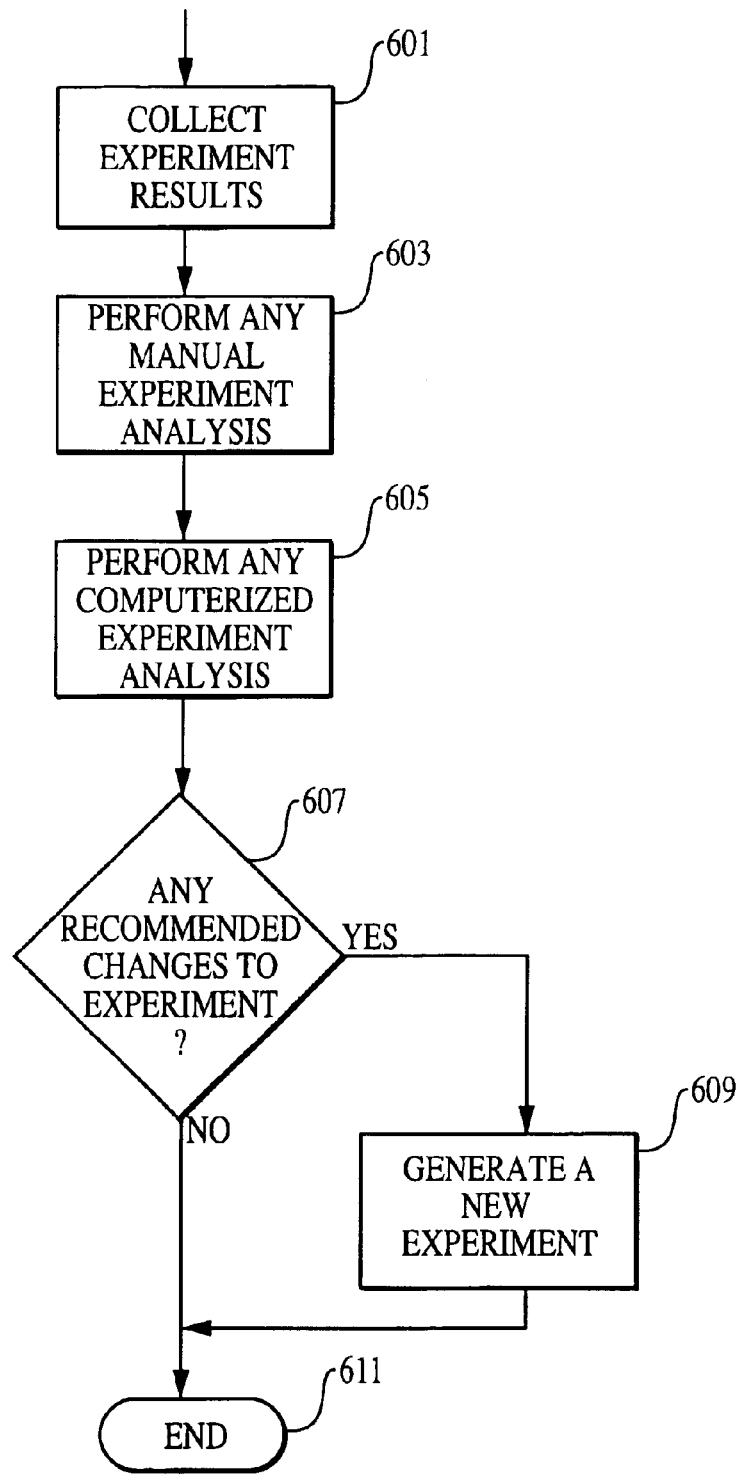
FIG. 6 is a flow chart of an analysis process portion of the overall process of FIG. 2.

Reference is made to FIG. 6, a flow chart of an analysis stage 207 of the overall process of FIG. 2. Experiment history setup information and history data is available for use in analysis and reporting. The experiment results are collected at step 601. At step 603, the experiment results are made available for any analysis. For example, a user may wish to make a manual analysis of the results. At step 605, the automated environment performs any requested computerized analysis. If there are any proposed changes to the experiment, at steps 607–609, the user may generate another experiment request. The analysis is completed at step 611.

Figure 7:
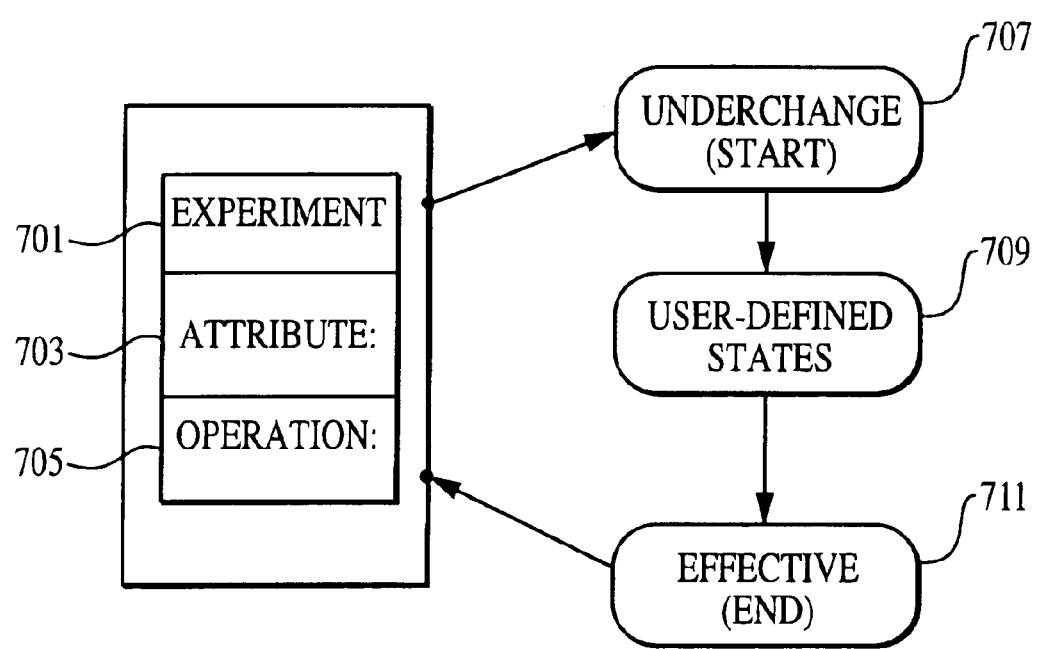
FIG. 7 is a diagram illustrating definition of an experiment.
Figure 8:
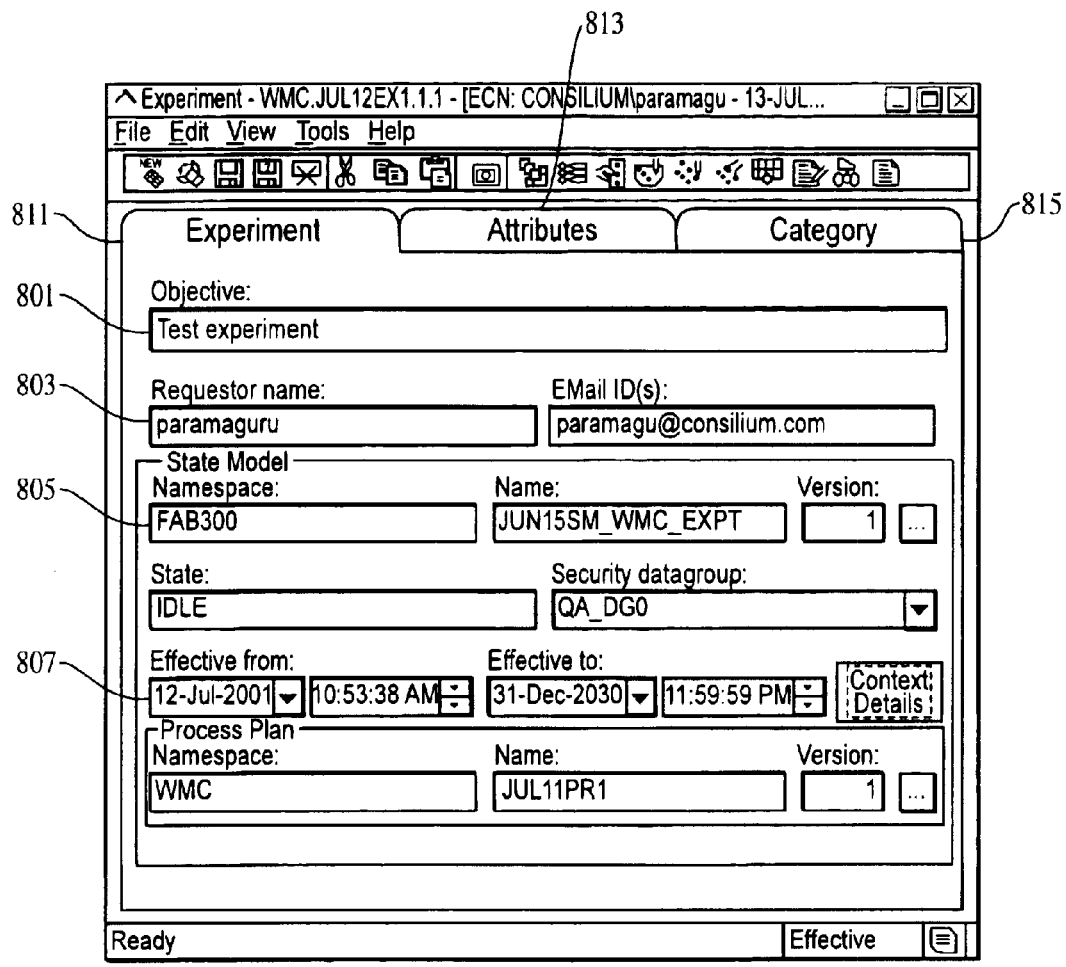
FIG. 8 is an exemplary user interface for an experiment editor, used in connection with at least some embodiments of the present invention.

Reference is made to FIG. 7, a diagram illustrating the defining of an experiment, as contemplated by at least some embodiments of the present invention. Specifically, the experiment 701 initially is associated with stored data including attribute information 703, for example defined by the user, and operation information 705, defining how the experiment operates. An experiment initially may be created from scratch, or may be copied from another experiment used as a template. Typical attributes would include sufficient information to identify useful information about the experiment, such as an experiment identifier, an experiment objective, a requestor name, an experiment name, a requestor e-mail address.

When the experiment is initially defined, a starting state will be "underchange" 707 (indicating that the experiment may be changed), and once the experiment is approved, the ending stage is effective (distributed) 711. There may be a series of user-defined states 709 which are under control of the user, subsequent to the underchange state, and prior to the effective state. The effective state is entered after the experiment is approved and signoff is obtained. Preferably, a user cannot change the contents of an experiment without appropriate permission. There may be other user-defined attributes, as well as attached external documents and/or files, and a user-defined state model. According to one possible implementation, the experiment is implemented as an object. Note that this state table corresponds to the order management process portion.

FIGS. 8–11 are examples of a potential user interface to be used in connection with at least some embodiments of the present invention. First, reference is made to FIG. 8, one aspect of an exemplary user interface for an experiment editor. Here, the user may provide information about the experiment 811, about experiment attributes 813, and optionally about experiment category 815. Experiment information may include an objective 801, which may summarize a description of the experiment. Other experiment information includes requestor identification information 803 (for example, name, e-mail address); the basic process or state model 805 for the experiment; and optionally an effective date 807 after which the experiment request will expire. The information collected in this initial interface is associated with the experiment request.

Figure 9:
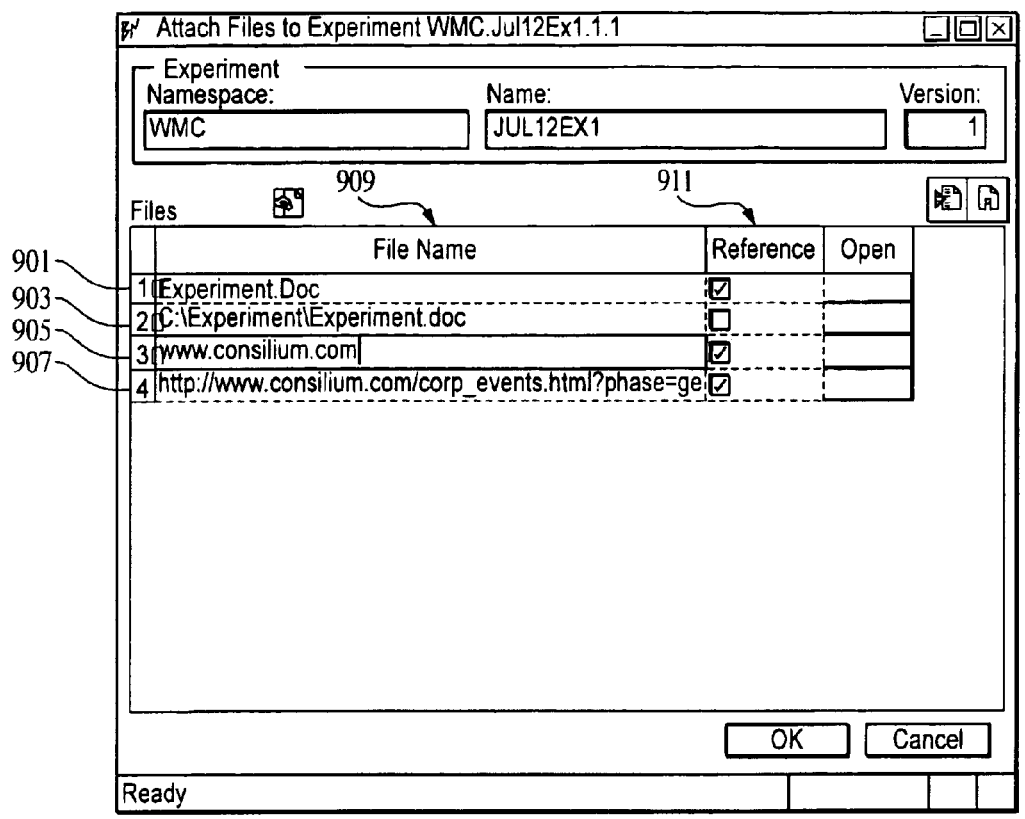
FIG. 9 is an exemplary user interface for the experiment editor, illustrating attachments, used in connection with the invention.

Reference is made to FIG. 9, another aspect of an exemplary user interface for the experiment editor, illustrating attachments used in connection with at least some embodiments of the present invention. In such embodiments, documents such as files, memos, forms, web addresses, etc., without limitation, may be attached to or otherwise associated with the experiment request. FIG. 9 lists, by way of example, several documents, by file name 909, which are attached to the experiment request: a local document experiment doc 901; a filepath for another document C:\Experiment\Experiment.doc 903; a web site www.consolium.com 905; and an http document http://www.consilium.com/corp_events.html?phase=ge 907. The user interface of the present example also indicates whether or not the file is simply a reference 911.

Figure 10:
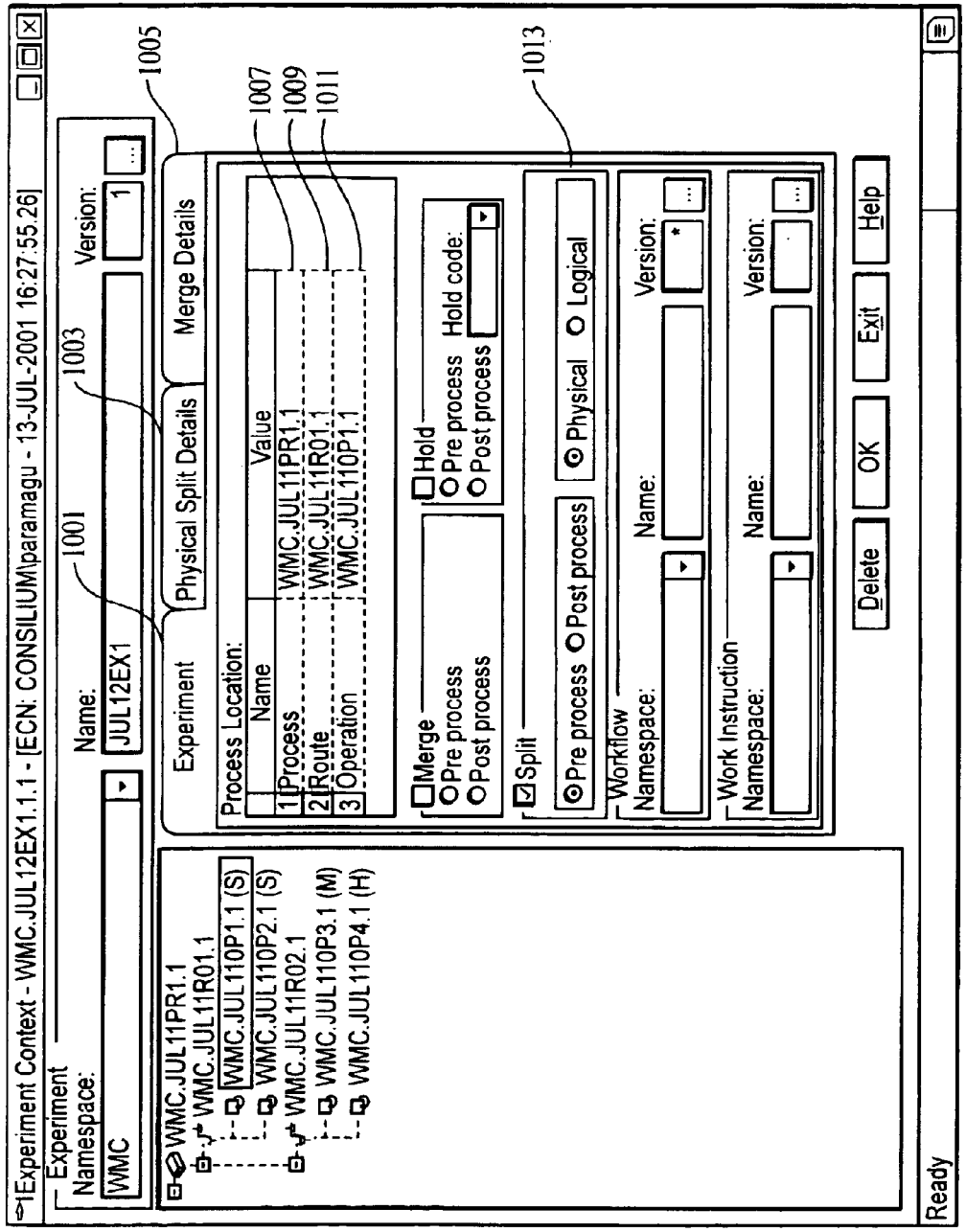
FIG. 10 is an exemplary user interface for an experiment editor, illustrating experiment content, used in connection with at least some embodiments of the present invention.

Reference is made to FIG. 10, another aspect of an exemplary user interface for the experiment editor, illustrating experiment content, used in connection with at least some embodiments of the present invention. This exemplary user interface allows access to experiment content 1001, physical split details 1003, and merge details 1005, the split treating the standard and test materials differently, and the merge detailing how the standard and test materials are treated when merged after the split. The experiment content 1001 provides the file controlling the experiment process. Here, it names the experiment process 1007, the experiment route 1009, and the experiment operation 1011. Note that additional information on the experiment may be provided, such as whether the processing is pre- or post-split 1013.

Figure 11:
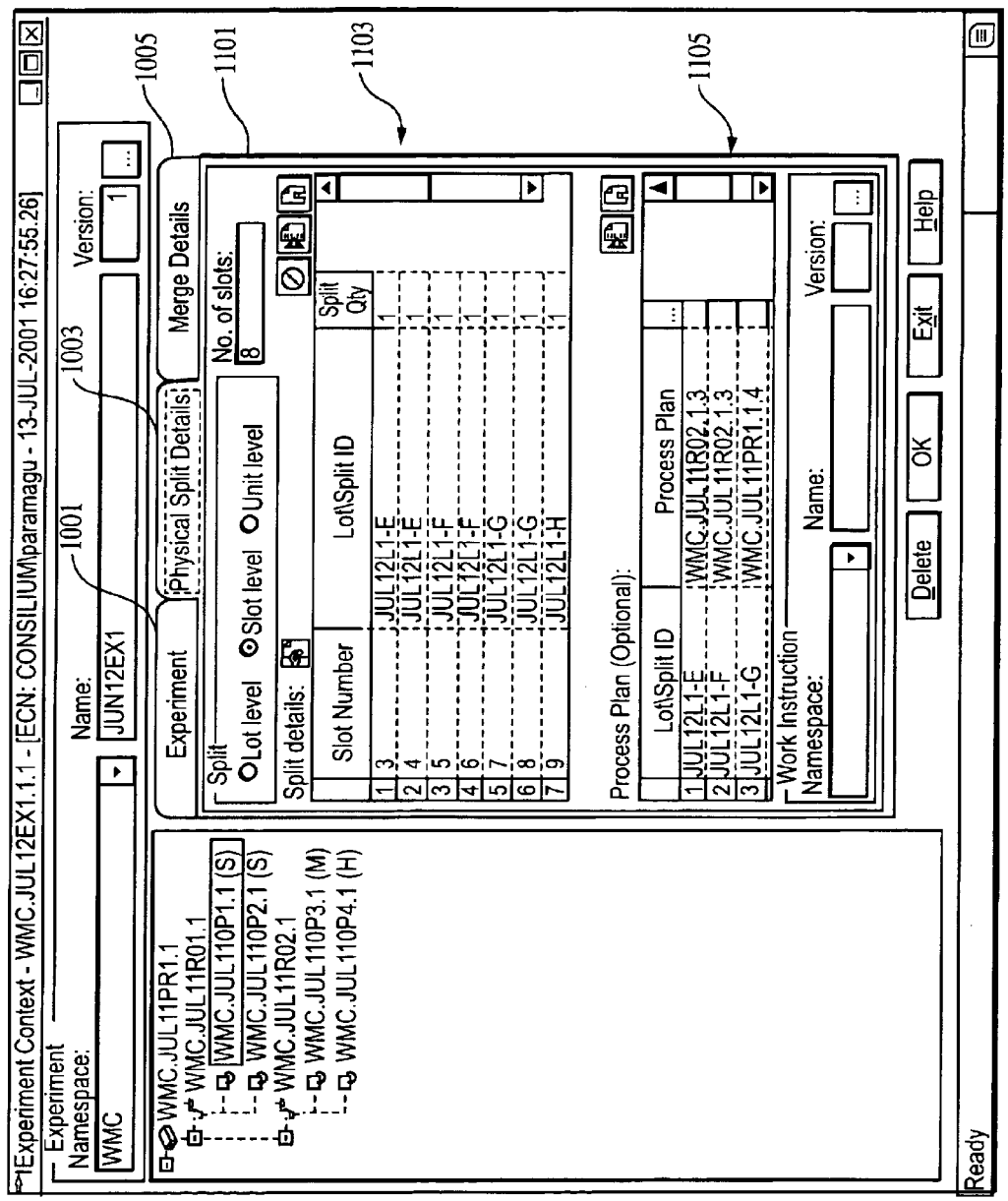
FIG. 11 is an exemplary user interface for an experiment editor, illustrating wafer level split details, used in connection with at least some embodiments of the present invention.

Reference is made to FIG. 11, an exemplary user interface for the experiment editor, illustrating wafer level split details, used in connection with the invention. Here, the processing data provides specifics, at lot level, slot level, or unit level 1101. The present example concerns a slot level split. As is illustrated, the split details 1103 provide the slots and the quantity to be split; as well as the process plans 1105 to be associated with each split.

Figure 12:
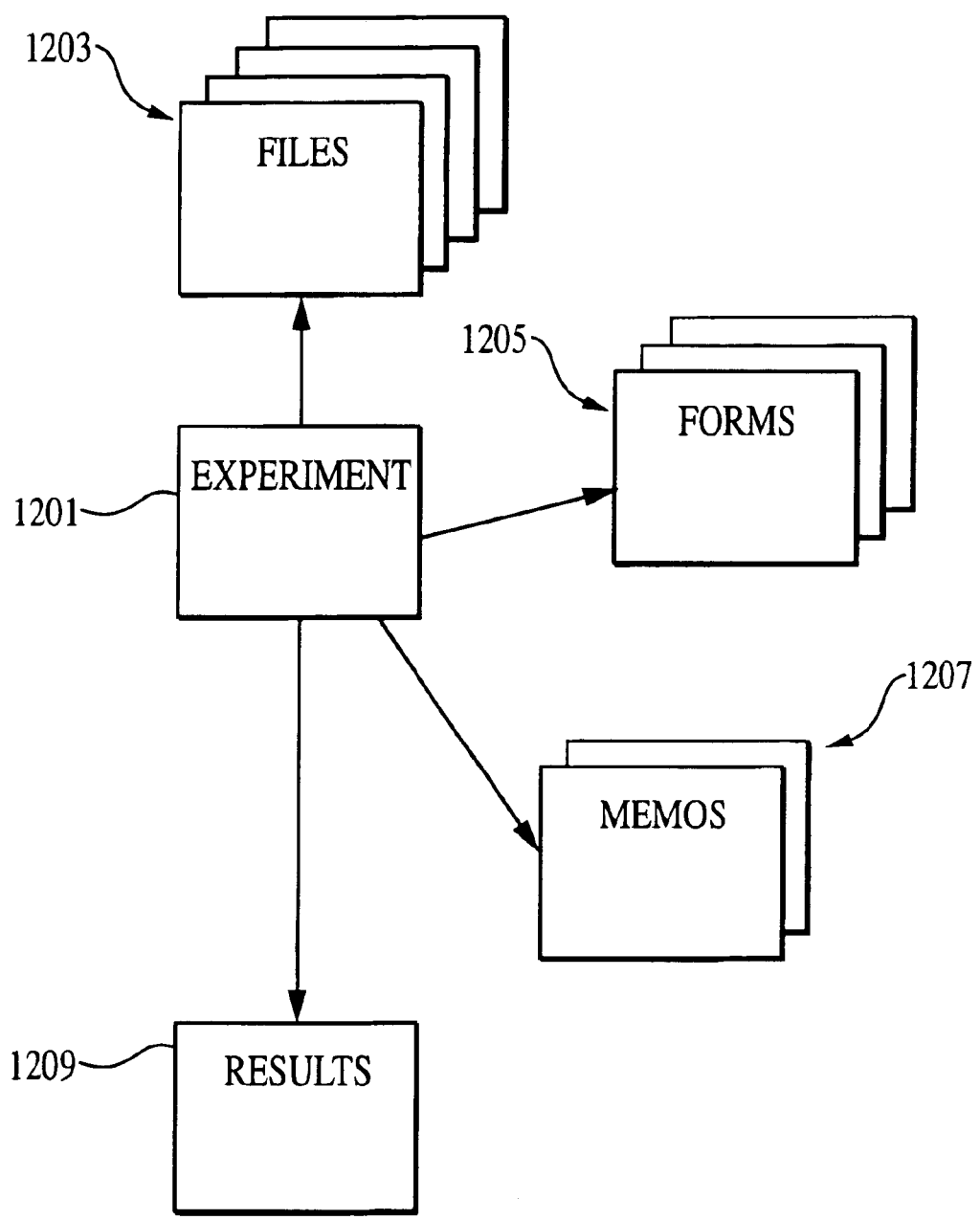
FIG. 12 is an illustration of at least some embodiments of an experiment.

Reference is made to FIG. 12, illustrating at least some embodiments of an experiment as contemplated by the present invention. Each experiment order 1201 may have associated with it various documents, such as files 1203, forms 1205, memos 1207, and experiment results 1209. Users can add or delete the document to/from the experiment order. Preferably, an attachment of a document will be considered an event, and may result in the publication of the event for example by e-mail or Workflows.

An experiment order may be copied by a user, together with attached documents, attributes, and other correlated information Also, according to at least some embodiments of the present invention, changes to the experiment order are stored in a history. Stored changes could include changes to native attributes, external document additions/deletions, and associated with other objects.

Consider an example of an experiment, with reference to FIGS. 3 through 6. In this example, the user wants a specified layer of a chip to be 10% thicker. The experiment in this example is an idea from an engineer. The experiment request is defined by a user, and submitted to the system at step 301 through 303. It could be a very general request with a simple textual description. An experiment object is created for the experiment request, and the experiment request is routed to the appropriate users for approval, at steps 305 through 313. The approval may be automated, such as delivery via e-mail awaiting a marking as approved. As shown in steps 321 through 329, until sign-off is received for the experiment, users may attach and/or delete relevant files, memos, etc. to the experiment object. If there are attachments or deletions, or if the experiment has changed state, the event is published to the users, shown in steps 323 through 327. The review process continues until sign-off is received.

Once sign-off is received, the experiment order is reviewed and translated to processing data, as shown in FIG. 4. This review and translation may be a manual process done by a person with the appropriate experience. In addition, it may also be performed (in whole or part) by automated means. In any event, it could be determined at step 403, for example, that wafers 1–11 in the lot will be the control (i.e., the established steps will not be effected), and the remainder of the wafers in the lot will be the test product. Also, it could be determined that a particular parameter in the $500^{th}$ cycle of a standard base process must be changed from 100 to 200. It would be specified at step 405 that the controls will be split off from the other processing. If it was necessary, a new recipe would be created or an existing recipe would be modified at step 407. All of the wafers will be under automated control. The two lots will be re-united and held or delivered for analysis. The information related to the variations from the base process, specific execution transactions, and any recipe change are stored as processing data. Note that the experiment could call for additional or different information to be collected as part of the processing results.

The experiment is then run, as shown in FIG. 5. At this point, the experiment processing data are handled no differently from a regular control job. That is, no exception processing is required. The processing data is input into the manufacturing system at step 501, and the test proceeds automatically by executing the processing data at step 503. Test results that are generated during execution of the experiment are stored at steps 505–507.

Following the experiment, test product might be reclassified from test materials to standard production materials, if within tolerances, and shipped to customers. Alternatively, the non-standard processed materials could be scrapped, or saved for further analysis, as shown in FIG. 6.

While this invention has been described in conjunction with the specific embodiments outlined above, many alternatives, modifications and variations will be apparent to those skilled in the art. Accordingly, the preferred embodiments of the invention as set forth are intended to be illustrative and not limiting. Various changes may be made without departing from the spirit and scope of the invention as defined in the following claims.

For example, it would be possible to define an entire experiment from scratch. A typical semiconductor manufacturing process is 500 to 750 steps, so it may often be more efficient to define an experiment as a variation from an existing process.

As another example, the controller may be a general purpose computer, a specially programmed special purpose computer; it may also be implemented as a distributed computer system rather than as a single computer.

What is claimed is:

1. A computer-implemented method for managing experiments relating to automated processing technology, comprising the steps of:
   (A) receiving an experiment order, the experiment order including at least some pre-planned deviation from a base process capable of operating in an automated environment;
   (B) obtaining an approval of the experiment order;
   (C) translating and storing at least a portion of the experiment order into processing data suitable for implementation by said automated environment; and
   (D) causing the experiment to be executed in conjunction with at least some portion of said base process by the automated environment, in accordance with said processing data.

2. The method of claim 1, wherein the obtaining step further includes the steps of storing data defining the experiment order, distributing the experiment order to a plurality of users, obtaining changes to the experiment order from at least one of the users, and receiving the approval for the experiment order from at least one user.

3. The method of claim 1, further comprising the step of attaching documents to the experiment order.

4. The method of claim 1, further comprising the step of publishing information indicating a state change of the experiment order, responsive to a document attached to the experiment order or to a change in state of the experiment order.

5. The method of claim 1, wherein the translating step further includes the step of receiving the processing data.

6. The method of claim 5, wherein:
   the experiment produces at least one test product and at least one production product; and
   wherein the processing data includes an indication of the base process, the changes to the base process, and a split-off of a control set; and
   wherein the split-off of a control set produces the at least one production product according to the base process and the changes to the base process produce the at least one test product.

7. The method of claim 1, further comprising the step of receiving and storing the results of the execution of the experiment.

8. The method of claim 1, wherein the automated environment produces semiconductor technology.

9. A computer-implemented system for managing experiments relating to automated processing technology, comprising:
   (A) an experiment order, the experiment order including at least some pre-planned deviation from a base process capable of operating in an automated environment;
   (B) an approval of the experiment order, obtained in response to receipt of the experiment order;
   (C) processing data suitable for implementation by said automated environment, translated from at least a portion of the experiment order; and
   (D) wherein said automated environment causes the experiment to be executed in conjunction with at least some portion of said base process by the automated environment, in accordance with the processing data.

10. The system of claim 9, wherein the approval further includes stored data defining the experiment order, a distribution of the experiment order to a plurality of users, stored changes to the experiment order from at least one of the users, and received approval for the experiment order from at least one user.

11. The system of claim 9, further comprising at least one document attached to the experiment order.

12. The system of claim 9, further comprising information indicating a state change of the experiment order, published responsive to a document attached to the experiment order or to a change in state of the experiment order.

13. The system of claim 9, wherein the processing data is received from a user.

14. The system of claim 13, wherein:
   the experiment produces at least one test product and at least one production product; and
   wherein the processing data includes an indication of the base process, the changes to the base process, and a split-off of a control set; and
   wherein the split-off of a control set produces the at least one production product according to the base process and the changes to the base process produce the at least one test product.

15. The system of claim 9, wherein the results of the execution of the experiment are received and stored.

16. The system of claim 9, wherein the automated environment produces semiconductor technology.

17. A computer-readable medium comprising instructions being executed by a computer, the instructions including a computer-implemented method for managing experiments relating to automated processing technology, the instructions for implementing the steps of:
   (A) receiving an experiment order, the experiment order including at least some pre-planned deviation from a base process capable of operating in an automated environment;
   (B) obtaining an approval of the experiment order;
   (C) translating and storing at least a portion of the experiment order into processing data suitable for implementation by said automated environment; and
   (D) causing the experiment to be executed in conjunction with at least some portion of said base process by the automated environment in accordance with the processing data.

18. The medium of claim 17, wherein the obtaining step further includes the steps of storing data defining the experiment order, distributing the experiment order to a plurality of users, obtaining changes to the experiment order from at least one of the users, and receiving the approval for the experiment order from at least one user.

19. The medium of claim 17, wherein the computer program further comprises the step of attaching documents to the experiment order.

20. The medium of claim 17, wherein the computer program further comprises the step of publishing information indicating a state change of the experiment order, responsive to a document attached to the experiment order or to a change in state of the experiment order.

21. The medium of claim 17, wherein the translating step further includes the steps of receiving the processing data.

22. The medium of claim 21, wherein:
   the experiment produces at least one test product and at least one production product; and
   wherein the processing data includes an indication of the base process, the changes to the base process, and a split-off of a control set; and
   wherein the split-off of a control set produces the at least one production product according to the base process and the changes to the base process produce the at least one test product.

23. The medium of claim 17, wherein the computer program further comprises the step of receiving and storing the results of the execution of the experiment.

24. The medium of claim 17, wherein the automated environment produces semiconductor technology.

25. A computer-implemented method for managing experiments relating to semiconductor technology, comprising the steps of:
  (A) receiving an experiment order, the experiment order including at least some pre-planned deviation from a base process capable of operating in an automated environment;
  (B) obtaining an approval of the experiment order;
  (C) translating and storing at least a portion of the experiment order into processing data suitable for implementation by said automated environment; and
  (D) causing the experiment to be executed in conjunction with at least some portion of said base process by the automated environment in accordance with the processing data;
  (E) wherein the obtaining step further includes the steps of storing data defining the experiment order, distributing the experiment order to a plurality of users, obtaining changes to the experiment order from at least one of the users, and receiving the approval for the experiment order from at least one user;
  (F) wherein the experiment produces at least one test product and at least one production product; and wherein the processing data includes an indication of the base process, the changes to the base process, and a split-off of a control set; and wherein the split-off of a control set produces the at least one production product according to the base process and the changes to the base process produce the at least one test product.

26. A computer-implemented system for managing experiments relating to semiconductor technology, comprising:
  (A) an experiment order, the experiment order including at least some pre-planned deviation from a base process capable of operating in an automated environment;
  (B) an approval of the experiment order, obtained in response to receipt of the experiment order;
  (C) processing data suitable for implementation by said automated environment, translated from at least a portion of the experiment order;
  (D) wherein said automated environment causes the experiment to be executed in conjunction with at least some portion of said base process by the automated environment in accordance with the processing data;
  (E) wherein the approval further includes stored data defining the experiment order, a distribution of the experiment order to a plurality of users, stored changes to the experiment order from at least one of the users, and received approval for the experiment order from at least one user; and
  (F) wherein the experiment produces at least one test product and at least one production product; and wherein the processing data includes an indication of the base process, the changes to the base process, and a split-off of a control set; and wherein the split-off of a control set produces the at least one production product according to the base process and the changes to the base process produce the at least one test product.

27. The method of claim 1, wherein the processing data is related to at least one of: a change to the base process itself, an addition to the base process, and an omission from the base process.

28. The system of claim 9, wherein the processing data is related to at least one of: a change to the base process itself, an addition to the base process, and an omission from the base process.

29. The medium of claim 17, wherein the processing data is related to at least one of: a change to the base process itself, an addition to the base process, and an omission from the base process.

30. A computer-implemented method for managing experiments relating to automated processing technology, comprising the steps of:
  (A) receiving an experiment order, the experiment order including at least some pre-planned deviation from a base process capable of operating in an automated environment;
  (B) translating and storing at least a portion of the experiment order into processing data suitable for implementation by said automated environment; and
  (C) causing the experiment to be executed in conjunction with at least some portion of said base process by the automated environment, in accordance with said processing data.

31. The method of claim 30, further comprising the step of publishing information indicating a state change of the experiment order, responsive to a document attached to the experiment order or to a change in state of the experiment order.

* * * * *